(12) United States Patent
Hayashi et al.

(10) Patent No.: US 11,722,004 B2
(45) Date of Patent: Aug. 8, 2023

(54) SIGNAL PROCESSING DEVICE, SIGNAL PROCESSING METHOD, AND PROGRAM

(71) Applicant: Sony Semiconductor Solutions Corporation, Kanagawa (JP)

(72) Inventors: Hiroaki Hayashi, Kanagawa (JP); Masatsugu Sugano, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/667,049

(22) Filed: Feb. 8, 2022

(65) Prior Publication Data

US 2022/0190640 A1 Jun. 16, 2022

Related U.S. Application Data

(63) Continuation of application No. 16/329,520, filed as application No. PCT/JP2017/036339 on Oct. 5, 2017, now Pat. No. 11,264,832.

(30) Foreign Application Priority Data

Oct. 19, 2016 (JP) .................................. 2016-204909

(51) Int. Cl.
*H04B 3/04* (2006.01)
*H02J 13/00* (2006.01)
(Continued)

(52) U.S. Cl.
CPC .......... *H02J 13/00009* (2020.01); *H04B 3/04* (2013.01); *H04B 3/32* (2013.01);
(Continued)

(58) Field of Classification Search
CPC .......... H04B 7/0682; H04B 3/04; H04B 3/32; H04L 7/0037; H04L 25/0264; H02J 13/0034
See application file for complete search history.

(56) References Cited

U.S. PATENT DOCUMENTS 3,745,257 A 7/1973 Fudemoto et al.
5,056,122 A 10/1991 Price
(Continued)

FOREIGN PATENT DOCUMENTS

CN 101009672 A 8/2007
CN 101926121 A 12/2010
(Continued)

OTHER PUBLICATIONS

Chinese Office Action dated Jun. 28, 2021 for corresponding Chinese Application No. 2017800631759**.

*Primary Examiner* — Vernal U Brown
(74) *Attorney, Agent, or Firm* — Michael Best & Friedrich LLP

(57) ABSTRACT

The present technology relates to a signal processing device, a signal processing method, and an electronic device that reduce the influence of crosstalk. In one example, a signal processing device includes a plurality of comparators; a delay unit adapted to delay output of each of the plurality of comparators; and a subtractor adapted to subtract, from a supplied signal, a signal from the delay unit. The signal processing device processes signals transmitted in N phases and includes (N-1) or more comparators. Each of the plurality of comparators has a different threshold value set and compares a received signal with the threshold value, and in a case where the signal transitions between a plurality of voltage levels, the threshold value is set to a value within adjacent voltage levels. In a second example, a reception device that receives a signal transmitted in multiple phases and via multiple lines.

20 Claims, 14 Drawing Sheets

(51) Int. Cl.
  *H04L 7/00*      (2006.01)
  *H04B 7/06*      (2006.01)
  *H04L 25/02*     (2006.01)
  *H04L 25/03*     (2006.01)
  *H04L 25/49*     (2006.01)
  *H04B 3/32*      (2006.01)

(52) U.S. Cl.
  CPC ......... *H04B 7/0682* (2013.01); *H04L 7/0037* (2013.01); *H04L 25/02* (2013.01); *H04L 25/0264* (2013.01); *H04L 25/03* (2013.01); *H04L 25/49* (2013.01)

(56) References Cited

U.S. PATENT DOCUMENTS

| | | |
|---|---|---|
| 5,101,210 A | 3/1992 | Milan |
| 5,321,689 A | 6/1994 | Suzuki et al. |
| 5,483,451 A | 1/1996 | Ohmae et al. |
| 5,615,411 A | 3/1997 | Abbey |
| 5,880,645 A | 3/1999 | Everitt et al. |
| 6,188,347 B1 | 2/2001 | Knudsen |
| 6,556,637 B1 | 4/2003 | Moriuchi |
| 6,757,325 B1 | 6/2004 | Abdelilah et al. |
| 7,269,212 B1 | 9/2007 | Chau et al. |
| 9,148,198 B1 | 9/2015 | Zhang et al. |
| 10,666,469 B2 * | 5/2020 | Bhattacharyya ........................... H04L 25/03146 |
| 2005/0180520 A1 | 8/2005 | Kim et al. |
| 2007/0201328 A1 | 8/2007 | Watanabe |
| 2010/0176982 A1 | 7/2010 | LaChartre |
| 2010/0327924 A1 | 12/2010 | Hasegawa et al. |

FOREIGN PATENT DOCUMENTS

| | | |
|---|---|---|
| CN | 102857253 A | 1/2013 |
| CN | 103259497 A | 8/2013 |
| CN | 104935356 A | 9/2015 |
| JP | 2005-318264 A | 11/2005 |
| JP | 2011-228803 A | 11/2011 |
| JP | 2015-228554 A | 12/2015 |
| WO | 2009/113462 A1 | 9/2009 |
| WO | 2015/182047 A1 | 3/2015 |
| WO | 2018/074251 A1 | 4/2018 |

* cited by examiner

*FIG. 5*

| SYMBOL NS (PS) | SIGNAL S1 (S11) | SIGNAL S2 (S12) | SIGNAL S3 (S13) |
|---|---|---|---|
| +x | 1 | 0 | 0 |
| −x | 0 | 1 | 1 |
| +y | 0 | 1 | 0 |
| −y | 1 | 0 | 1 |
| +z | 0 | 0 | 1 |
| −z | 1 | 1 | 0 |

SIGNAL PROCESSING DEVICE, SIGNAL PROCESSING METHOD, AND PROGRAM

CROSS REFERENCES TO RELATED APPLICATIONS

The present application is a Continuation of application Ser. No. 16/329,520, filed Feb. 28, 2019, which is a 371 Nationalization of PCT/JP2017/036339, filed Oct. 5, 2017, which in turn claims priority from Japanese Application Number 2016-204909, filed Oct. 19, 2016, the entire contents of which are incorporated herein by reference.

TECHNICAL FIELD

The present technology relates to a signal processing device, a signal processing method, and a program, and relates to, for example, a signal processing device, a signal processing method, and a program which process a received signal.

BACKGROUND ART

Various devices such as a semiconductor chip, a sensor, and a display device are mounted on an electronic apparatus along with recent achievement of high functionality and multi-functionalization in the electronic apparatus. A large amount of data is exchanged between these devices, and a data amount thereof is increased in accordance with such achievement of the high functionality and multi-functionalization in the electronic apparatus. Accordingly, for example, a high-speed interface capable of transmitting and receiving data at several Gbps is used to exchange the data.

Various kinds of technologies to improve communication performance have been developed for such a high-speed interface. For example, Patent Document 1 discloses a noise cancellation circuit that suppresses power source noise generated at a differential output buffer.

CITATION LIST

Patent Document

Patent Document 1: Japanese Patent Application Laid-Open No. 2005-318264

SUMMARY OF THE INVENTION

Problems to be Solved by the Invention

Thus, in a communication system, high communication performance is desired and further improvement in the communication performance is expected. Therefore, it is desirable to provide a signal processing device capable of improving communication performance.

The present technology is made in view of the above-described situation and is directed to providing a signal processing device having improved communication performance.

Solutions to Problems

A signal processing device according to an aspect of the present technology includes a plurality of comparators; a delay unit adapted to delay output from each of the plurality of comparators; and a subtractor adapted to subtract, from a supplied signal, a signal from the delay unit.

A signal processing method according to an aspect of the present technology includes the steps of: comparing a supplied signal with a predetermined threshold value by each of a plurality of comparators; delaying a comparison result from each of the plurality of comparators; and subtracting the delayed comparison result from the supplied signal.

A program according to an aspect of the present technology causes a computer to execute a process including the steps of: comparing a supplied signal with a predetermined threshold value by each of a plurality of comparators; delaying a comparison result from each of the plurality of comparators; and subtracting the delayed comparison result from the supplied signal.

In the signal processing device, signal processing method, and program according to the aspect of the present technology, a supplied signal and the predetermined threshold value are compared by each of the plurality of comparators, the comparison result from each of the plurality of comparators is delayed, and the delayed comparison result is subtracted from the supplied signal.

Note that the signal processing device may be an independent device or may be an internal block constituting one device.

Additionally, the program can be provided by being transmitted via a transmission medium or by being recorded in a recording medium.

Effects of the Invention

According to the aspect of the present technology, it is possible to provide a signal processing device having improved communication performance.

Note that the effect recited herein is not necessarily limited and may be any effect recited in the present disclosure.

BRIEF DESCRIPTION OF DRAWINGS

FIG. 5 is a diagram to describe the symbols transmitted and received by the communication system.

MODE FOR CARRYING OUT THE INVENTION

Modes for carrying out the present technology (hereinafter referred to as "embodiments") will be described below.

<Configuration of Communication System>

Figure 1:
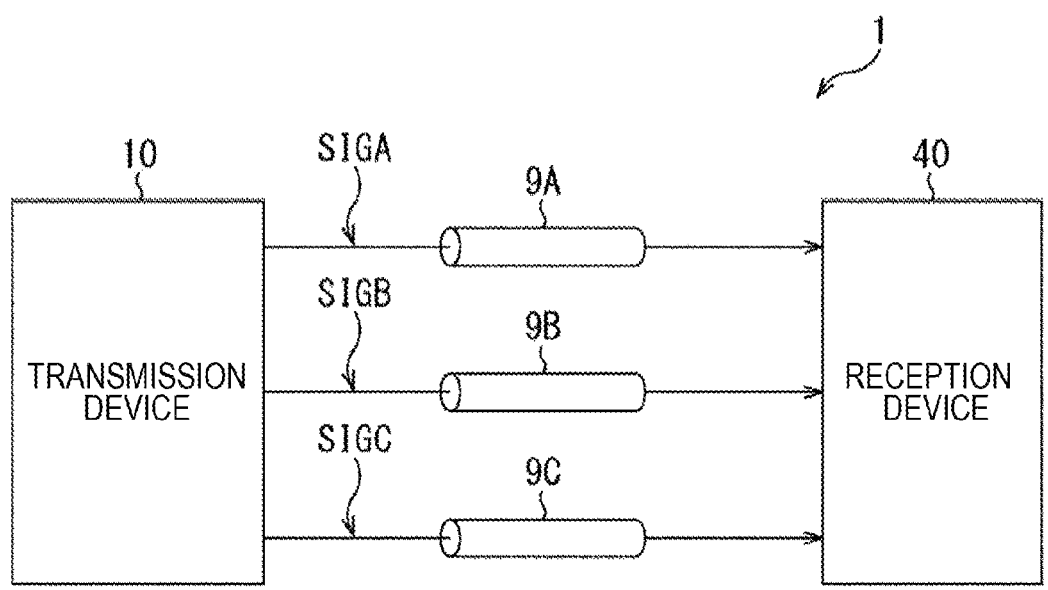
FIG. 1 is a diagram illustrating an exemplary configuration of an embodiment of a communication system to which the present technology is applied.

FIG. 1 is a diagram illustrating a configuration of an embodiment of a communication system (communication system 1). The communication system 1 performs communication by using signals having three voltage levels.

The communication system 1 includes a transmission device 10 and a reception device 40. In the communication system 1, the transmission device 10 transmits signals SIGA, SIGB, and SIGC to the reception device 40 via transmission lines 9A, 9B, and 9C, respectively. The transmission lines 9A to 9C to transmit these signals have characteristic impedance of 50 ohms, for example.

The signals SIGA, SIGB, and SIGC each transition between the three voltage levels (high-level voltage VH, medium-level voltage VM, and low-level voltage VL), and a symbol is transmitted in combination of the respective voltage levels of the signals SIGA, SIGB, and SIGC. The low-level voltage VL is higher than ground voltage. Additionally, the signal SIGA, signal SIGB, and signal SIGC are signals which exclusively output the high-level voltage VH, the medium-level voltage VM, and the low-level voltage VL, respectively.

Figure 2:
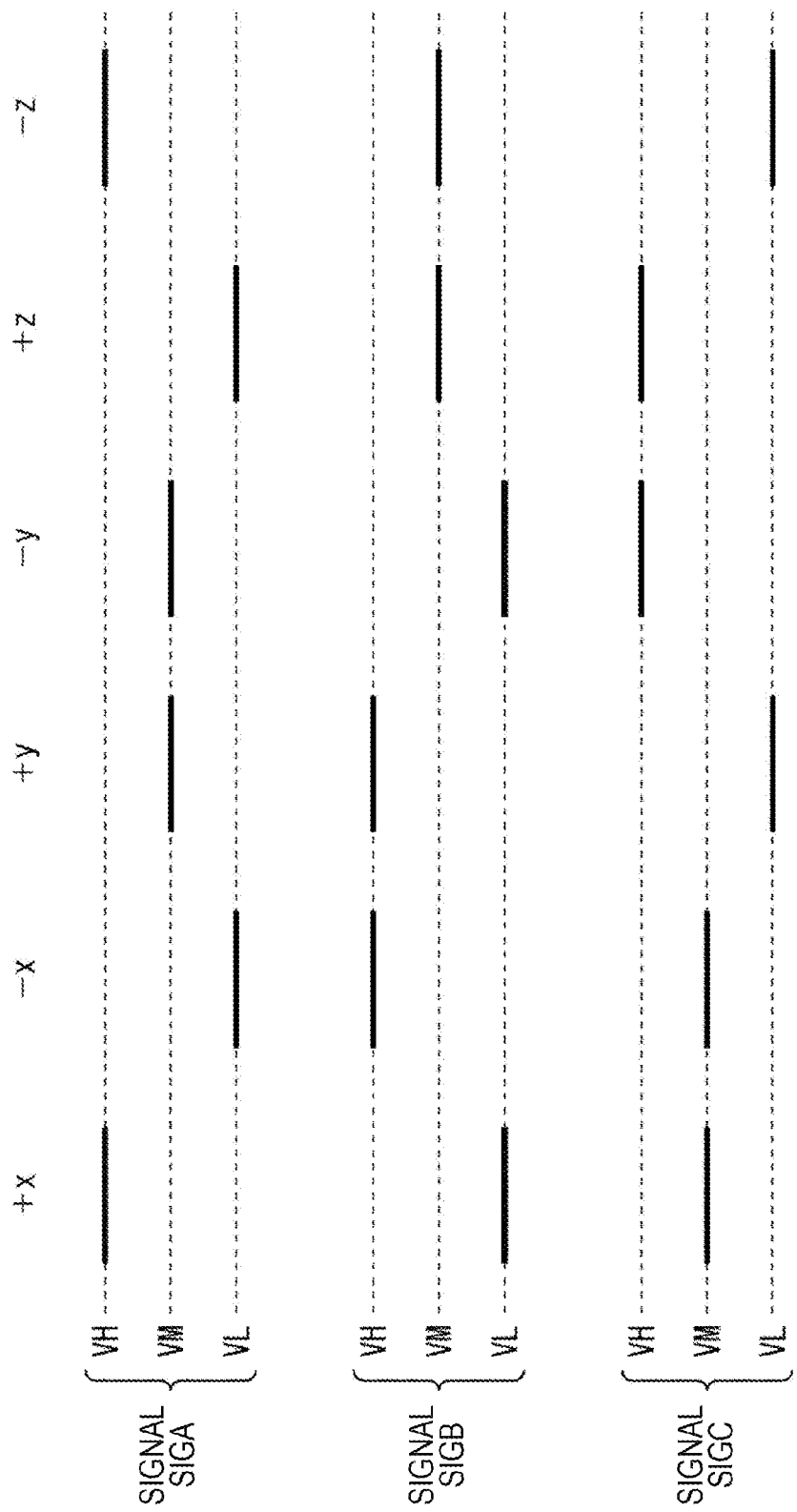
FIG. 2 is a diagram to describe a voltage state of a signal transmitted and received by the communication system.

FIG. 2 illustrates voltage states of the signals SIGA, SIGB, and SIGC. The transmission device 10 transmits six symbols "+x", "−x", "+y", "−y", "+z", and "−z" by using the three signals SIGA, SIGB and SIGC.

For example, in a case of transmitting the symbol "+x", the transmission device 10 sets the signal SIGA to the high-level voltage VH, the signal SIGB to the low-level voltage VL, and the signal SIGC to the medium-level voltage VM. In a case of transmitting the symbol "−x", the transmission device 10 sets the signal SIGA to the low-level voltage VL, the signal SIGB to the high-level voltage VH, and the signal SIGC to the medium-level voltage VM. In a case of transmitting the symbol "+y", the transmission device 10 sets the signal SIGA to the medium-level voltage VM, the signal SIGB to the high-level voltage VH, and the signal SIGC to the low-level voltage VL.

In a case of transmitting the symbol "−y", the transmission device 10 sets the signal SIGA to the medium-level voltage VM, the signal SIGB to the low-level voltage VL, and the signal SIGC to the high-level voltage VH. In a case of transmitting the symbol "+z", the transmission device 10 sets the signal SIGA to the low-level voltage VL, the signal SIGB to the medium-level voltage VM, and the signal SIGC to the high-level voltage VH.

In a case of transmitting the symbol "−z", the transmission device 10 sets the signal SIGA to the high-level voltage VH, the signal SIGB to the medium-level voltage VM, and the signal SIGC to the low-level voltage VL.

Figure 3:
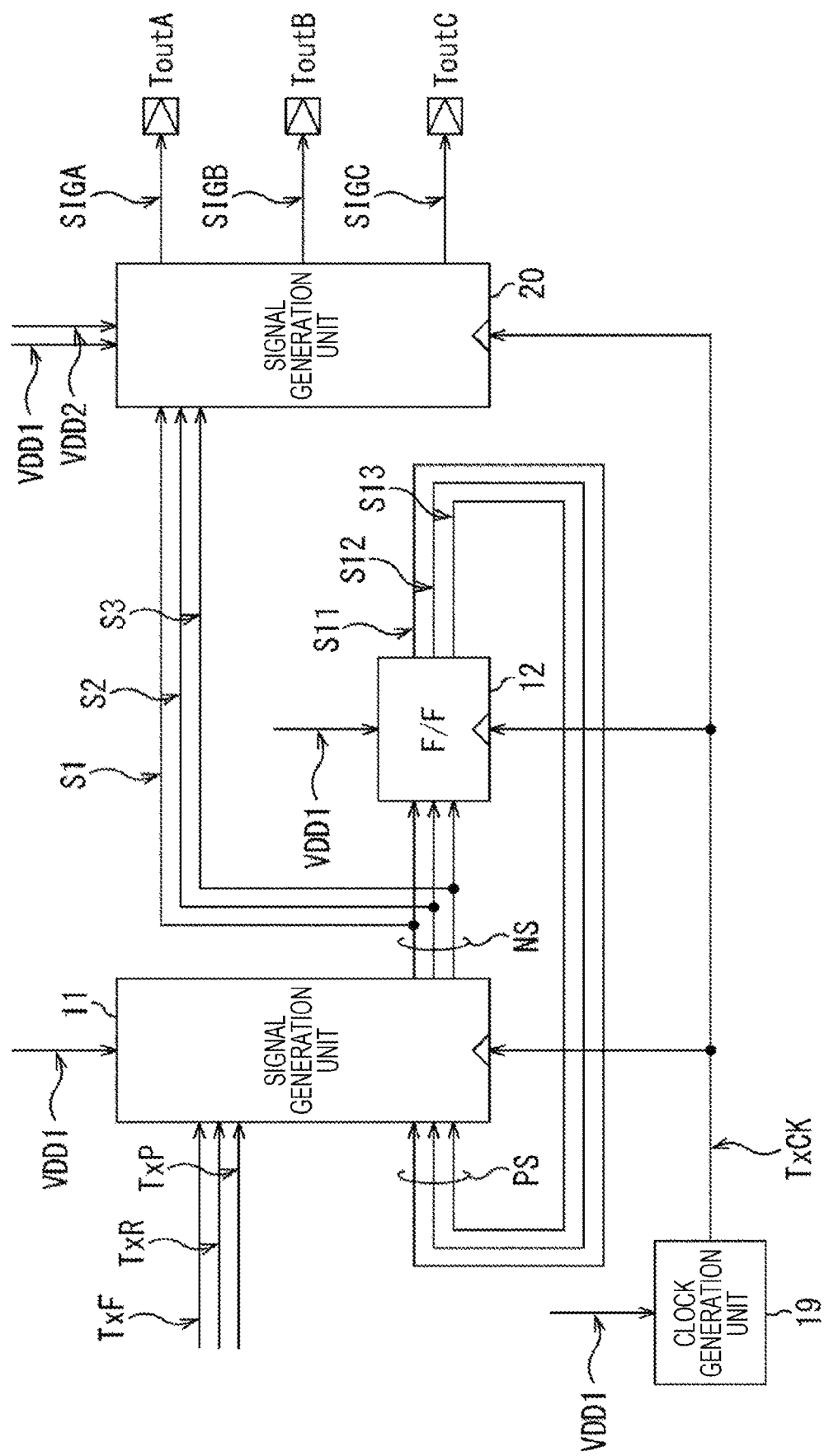
FIG. 3 is a diagram illustrating an exemplary configuration of a transmission device.

FIG. 3 illustrates an exemplary configuration of the transmission device 10. The transmission device 10 includes a clock generation unit 19, a signal generation unit 11, a flip-flop (F/F) 12, and an output unit 20.

The clock generation unit 19 generates a clock TxCK. The clock generation unit 19 includes, for example, a phase locked loop (PLL) and generates a clock TxCK on the basis of a reference clock (not illustrated) supplied from the outside of the transmission device 10, for example. Then, the clock generation unit 19 supplies the clock TxCK to the signal generation unit 11, the flip-flop 12, and the output unit 20.

The signal generation unit 11 obtains a symbol NS on the basis of a symbol PS represented by signals S11 to S13, signals TxF, TxR, and TxP, and the clock TxCK, and outputs the symbol NS by using signals S1 to S3. Here, each of the symbols NS and PS represents any one of the six symbols "+x", "−x", "+y", "−y", "+z", and "−z". The symbol PS is the symbol previously transmitted (previous symbol) and the symbol NS is the symbol to be transmitted next (next symbol).

Figure 4:
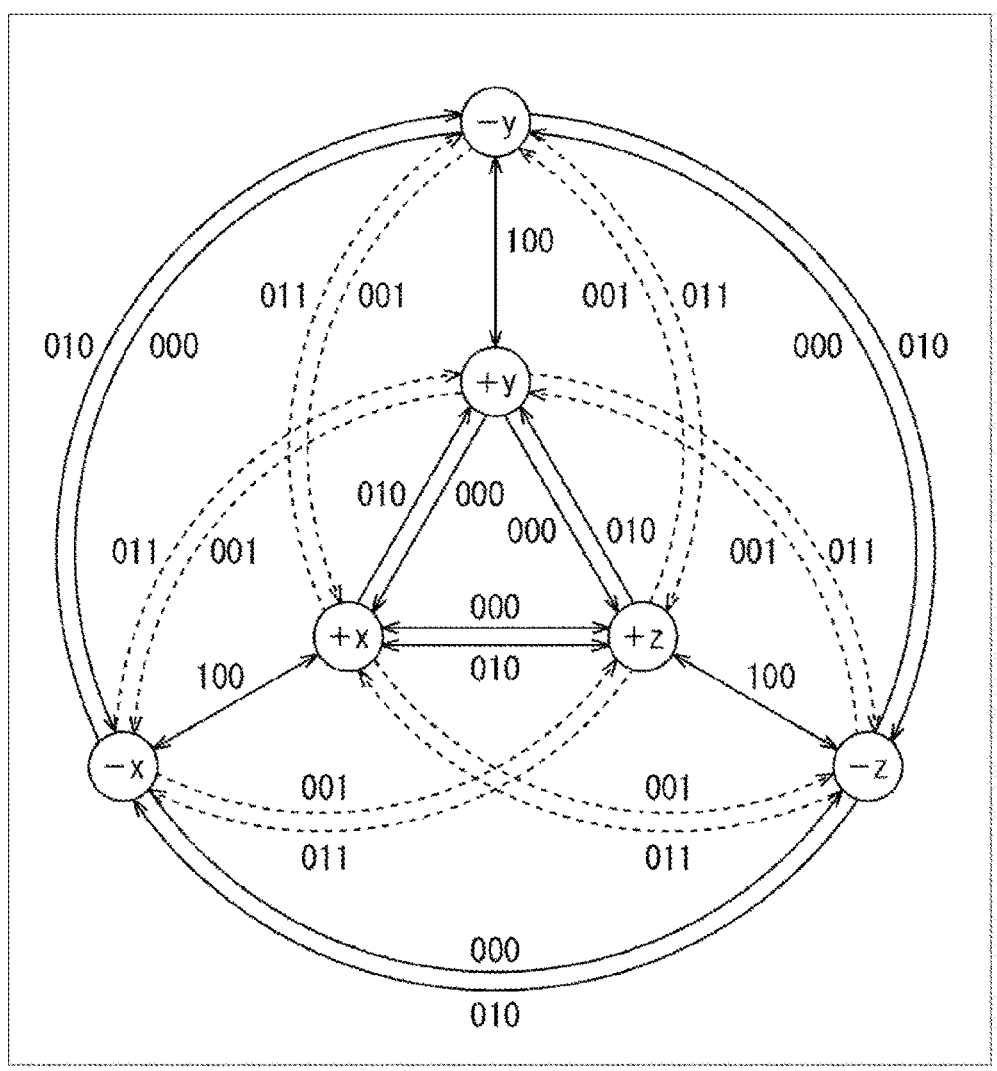
FIG. 4 is a diagram to describe transition of symbols transmitted and received by the communication system.

FIG. 4 illustrates operation of the signal generation unit 11. FIG. 4 illustrates transition between the six symbols "+x", "−x", "+y", "−y", "+z", and "−z". Values of three digits recited next to each transition are values of the signals TxF, TxR, and TxP in this order.

A signal TxF(Flip) causes a symbol to transition between "+x" and "−x", causes a symbol to transition between "+y" and "−y", and causes a symbol to transition between "+z" and "−z". More specifically, in a case where the signal TxF is "1", a symbol transitions so as to change polarity of the symbol (for example, from "+x" to "−x"), and in a case where the signal TxF is "0", such transition is not performed.

In the case where the signal TxF is "0", signals TxR (rotation) and TxP (polarity) each causes a symbol to transition other than between "+x" and "−x", other than between "+y" and "−y", and other than between "+z" and "−z".

More specifically, in a case where the signals TxR and TxP are "1" and "0" respectively, a symbol transitions clockwise in FIG. 4 (for example, from "+x" to "+y") while keeping polarity of the symbol, and in a case where the signals TxR and TxP are "1" and "1" respectively, the polarity of the symbol is changed and also a symbol transitions clockwise in FIG. 4 (for example, from "+x" to "−y"). Additionally, in a case where the signals TxR and TxP are "0" and "0" respectively, a symbol transitions counterclockwise in FIG. 4 (for example, from "+x" to "+z") while keeping the polarity of the symbol, and in a case where the signals TxR and TxP are "0" and "1" respectively, the polarity of the symbol is changed and also the symbol transitions counterclockwise in FIG. 4 (for example, from "+x" to "−z").

Thus, a transition direction of a symbol is identified by the signals TxF, TxR, and TxP in the signal generation unit 11. The signal generation unit 11 obtains the symbol NS on the basis of the symbol PS represented by the signals S11 to S13, signals TxF, TxR, and TxP, and the clock TxCK, and outputs the symbol NS by using signals S1 to S3.

In this example, as illustrated in FIG. 5, the symbol NS is correlated to the signals S1 to S3, and the symbol PS is correlated to the signals S11 to S13. Then, the signal generation unit 11 supplies the symbol NS to the flip-flop 12 and the output unit 20 by using the signals S1 to S3.

The flip-flop 12 delays each of the signals S1, S2, and S3 by an amount corresponding to one clock of the clock TxCK, and outputs the signals as the signals S11, S12, and S13. In other words, the flip-flop 12 generates the symbol PS by delaying the symbol NS represented by the signals S1, S2, and S3 by an amount corresponding to one clock of the clock TxCK. Then, the flip-flop 12 supplies the signals S11, S12, and S13 to the signal generation unit 11.

The output unit 20 generates the signals SIGA, SIGB, and SIGC on the basis of the signals S1 to S3, and outputs the signals from output terminals ToutA, ToutB and ToutC, respectively.

<Configuration of Reception Device>

Figure 6:
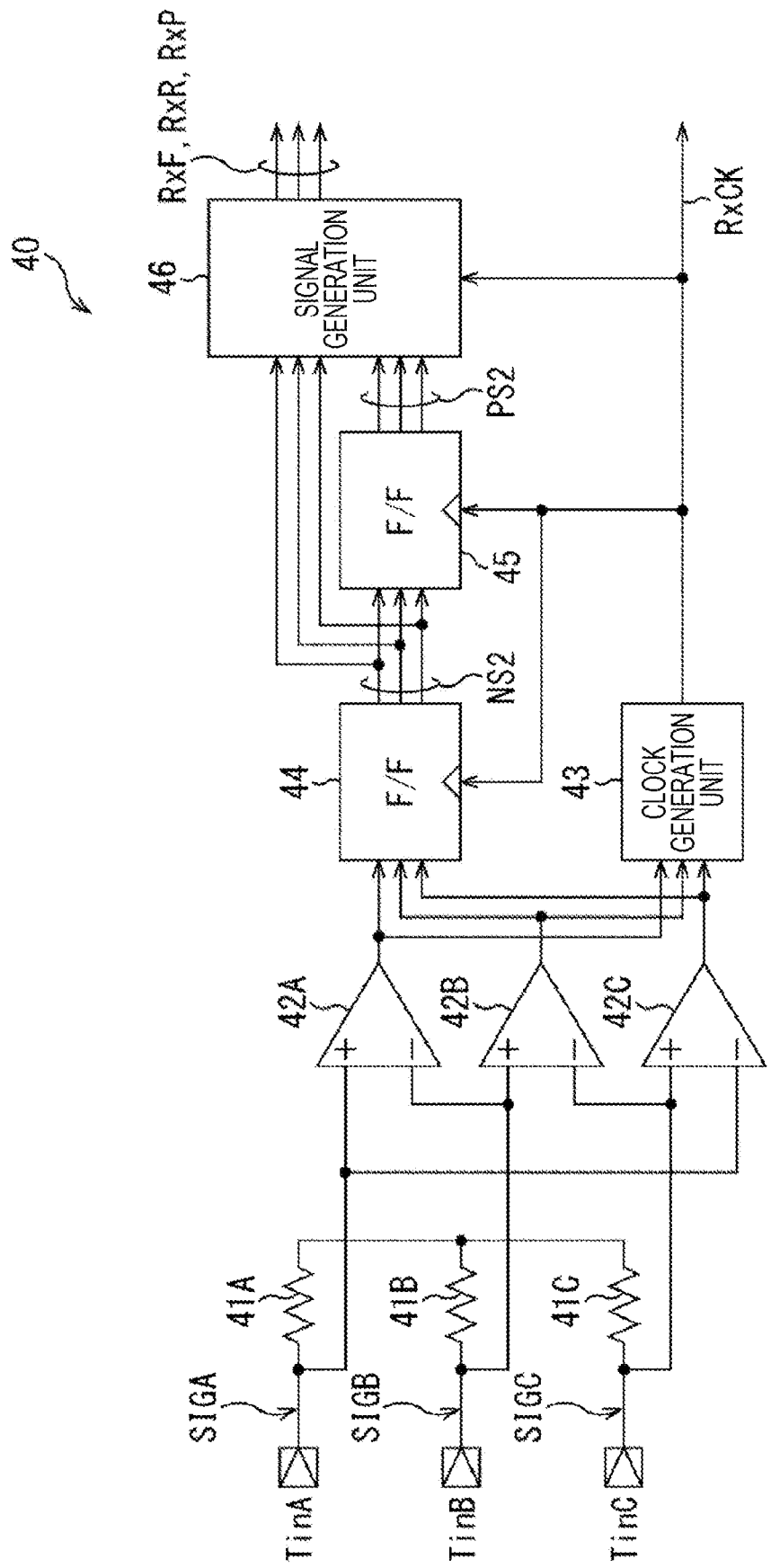
FIG. 6 is a diagram illustrating an exemplary configuration of a reception device.

FIG. 6 illustrates an exemplary configuration of the reception device 40. The reception device 40 includes resistance elements 41A, 41B, and 41C, amplifiers 42A, 42B, and 42C, a clock generation unit 43, flip-flops 44 and 45, and a signal generation unit 46.

The resistance elements 41A, 41B, and 41C function as termination resistances in the communication system 1. The resistance element 41A has one end connected to an input terminal TinA and supplied with the signal SIGA, and has the other end connected to the resistance elements 41B and 41C.

The resistance element 41B has one end connected to an input terminal TinB and supplied with the signal SIGB, and has the other end connected to the resistance elements 41A and 41C. The resistance element 41C has one end connected to an input terminal TinC and supplied with the signal SIGC, and has the other end connected to the resistance elements 41A and 41B.

Each of the amplifiers 42A, 42B, and 42C outputs a signal in accordance with a difference between a signal at a positive input terminal and a signal at a negative input terminal. The positive input terminal of the amplifier 42A is connected to the negative input terminal of the amplifier 42C and one end of the resistance element 41A and is supplied with the signal SIGA. The negative input terminal thereof is connected to the positive input terminal of the amplifier 42B and one end of the resistance element 41B and is supplied with the signal SIGB.

The positive input terminal of the amplifier 42B is connected to the negative input terminal of the amplifier 42A and one end of the resistance element 41B and is supplied with the signal SIGB. The negative input terminal thereof is connected to the positive input terminal of the amplifier 42C and one end of the resistance element 41C and is supplied with the signal SIGC. The positive input terminal of the amplifier 42C is connected to the negative input terminal of the amplifier 42B and one end of the resistance element 41C and is supplied with the signal SIGC. The negative input terminal thereof is connected to the positive input terminal of the amplifier 42A and one end of the resistance element 41A and is supplied with the signal SIGA.

With this configuration, the amplifier 42A outputs a signal in accordance with a difference between the signal SIGA and the signal SIGB (SIGA−SIGB), the amplifier 42B outputs a signal in accordance with a difference between the signal SIGB and the signal SIGC (SIGB−SIGC), and the amplifier 42C outputs a signal in accordance with a difference between the signal SIGC and the signal SIGA (SIGC−SIGA).

Figure 7:
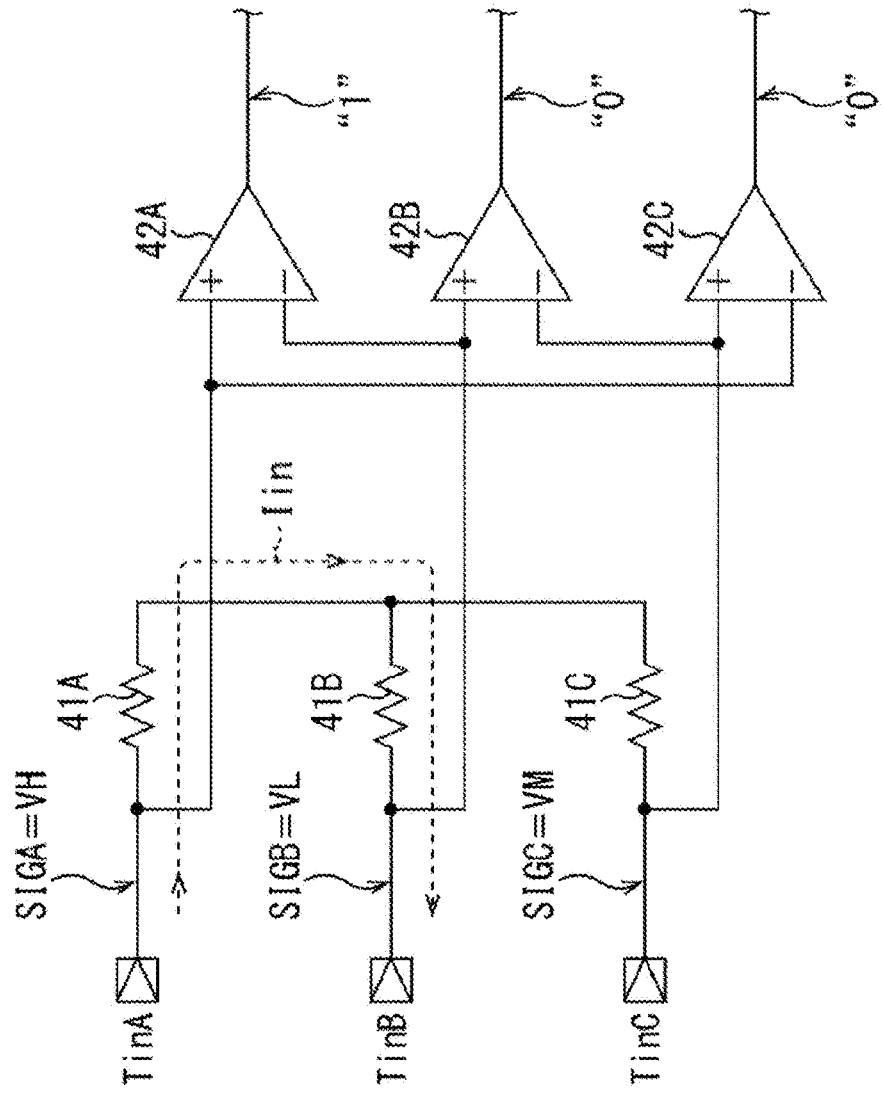
FIG. 7 is a diagram to describe operation of the reception device.

FIG. 7 illustrates exemplary operation of the amplifiers 42A, 42B, and 42C. In this example, the signal SIGA is the high-level voltage VH and the signal SIGB is the low-level voltage VL. At this point, the voltage of the signal SIGC is set to the medium-level voltage VM by the resistance elements 41A, 41B, and 41C.

In this case, current Iin flows sequentially to the input terminal TinA, resistance element 41A, resistance element 41B, and input terminal TinB. Additionally, the high-level voltage VH is supplied to the positive input terminal of the amplifier 42A, the low-level voltage VL is supplied to the negative input terminal thereof, and a difference becomes positive. Therefore, the amplifier 42A outputs "1".

Additionally, the low-level voltage VL is supplied to the positive input terminal of the amplifier 42B, the medium-level voltage VM is supplied to the negative input terminal thereof, and a difference becomes negative. Therefore, the amplifier 42B outputs "0". Additionally, the medium-level voltage VM is supplied to the positive input terminal of the amplifier 42C, the high-level voltage VH is supplied to the negative input terminal thereof, and a difference becomes negative. Therefore, the amplifier 42C outputs "0".

The clock generation unit 43 generates a clock RxCK on the basis of output signals of the amplifiers 42A, 42B, and 42C.

The flip-flop 44 delays each of the output signals of the amplifiers 42A, 42B, and 42C by an amount corresponding to one clock of the clock RxCK and outputs the respective signals. In other words, the output signals of the flip-flop 34 represent a symbol NS2. Here, the symbol NS2 represents any one of the six symbols "+x", "−x", "+y", "−y", "+z", and "−z" in a manner similar to the symbols PS and NS.

The flip-flop 45 delays the three output signals of the flip-flop 44 by the amount corresponding to one clock of the clock RxCK, and output the respective signals. In other words, the flip-flop 45 generates a symbol PS2 by delaying the symbol NS2 by the amount corresponding to one clock of the clock RxCK. This symbol PS2 is a symbol previously received and represents any one of the six symbols "+x", "−x", "+y", "−y", "+z", and "−z" in a manner similar to the symbol NS2.

The signal generation unit 46 generates signals RxF, RxR, and RxP on the basis of the output signals of the flip-flops 44 and 45 and the clock RxCK. The signals RxF, RxR, and RxP correspond to the signals TxF, TxR, and TxP in the transmission device 10 respectively, and represent symbol transition.

The signal generation unit 46 identifies symbol transition (FIG. 4) on the basis of a symbol CS2 represented by the output signal of the flip-flop 44 and the symbol PS2 represented by the output signal of the flip-flop 45, and generates the signals RxF, RxR, and RxP.

<Influence of Crosstalk>

Referring again to FIG. 1, the transmission device 10 and the reception device 40 transmit and receive the signals SIGA, SIGB, and SIGC via the transmission lines 9A, 9B, and 9C. In other words, the communication system illustrated in FIG. 1 is a three-phase transmission system. In a case of the three-phase transmission, there is a possibility that influence of crosstalk may be increased more than in a case of, for example, two-phase transmission. Therefore, a mechanism to reduce the influence of crosstalk is necessary.

In a case where the transmission device 10 and the reception device 40 adopt two-phase transmission (two-line differential system) in which transmission and reception is performed only via the transmission line 9A and the transmission line 9B, the transmission line 9A may affect the transmission line 9B and the transmission line 9B may affect the transmission line 9A, however; since the signal of the transmission line 9A and the signal of the transmission line 9B have a differential relation in which phases are different by 180 degrees (positive phase and inverse phase), the influence on the transmission lines 9 are reduced and the influence of crosstalk can also be reduced by calculating a difference in each of the amplifiers 42 on the reception device 40 side as described above.

In the case of the three-phase transmission as illustrated in FIG. 1, a signal flowing through the transmission line 9A, a signal flowing through the transmission line 9B, and a signal flowing through the transmission line 9C do not keep the relation of the positive phase and the inverse phase. Therefore, the transmission line 9A may affect the transmission line 9B and the transmission line 9C, the transmission line 9B may affect the transmission line 9A and the transmission line 9C, and the transmission line 9C may affect the transmission line 9A and the transmission line 9B. In the case of the three-phase transmission, the influence on the transmission lines 9 cannot be eliminated and the influence of crosstalk may be caused even though the difference is calculated at, for example, each of the amplifiers 42 on the reception device 40 side as described above.

Additionally, it is generally known that an attenuation factor is increased when a communication speed becomes higher. In a case of applying the communication system 1 to high-speed communication, the attenuation factor may be increased and signal quality may be deteriorated.

In other words, in a case of high-speed communication using multiple lines and multiple phases like the three-phase transmission, signals flowing in the respective transmission lines do not keep an inversion relation such as a positive phase and an inverse phase, different from the two-line differential system, and the influence of crosstalk may be caused inside an own lane.

In the case of the three-phase transmission, waveform quality may be deteriorated without suppressing crosstalk. Therefore, a mechanism to suppress the crosstalk will be described below by exemplifying the case of the three-phase transmission. Meanwhile, the description will be continued by exemplifying the case of three-phase transmission here, but the present technology is also applicable to a case of a transmission system of three or more phases (transmission system having multiple phases and multiple lines).

<Equalization Technology 1 to Suppress Crosstalk>

Figure 8:
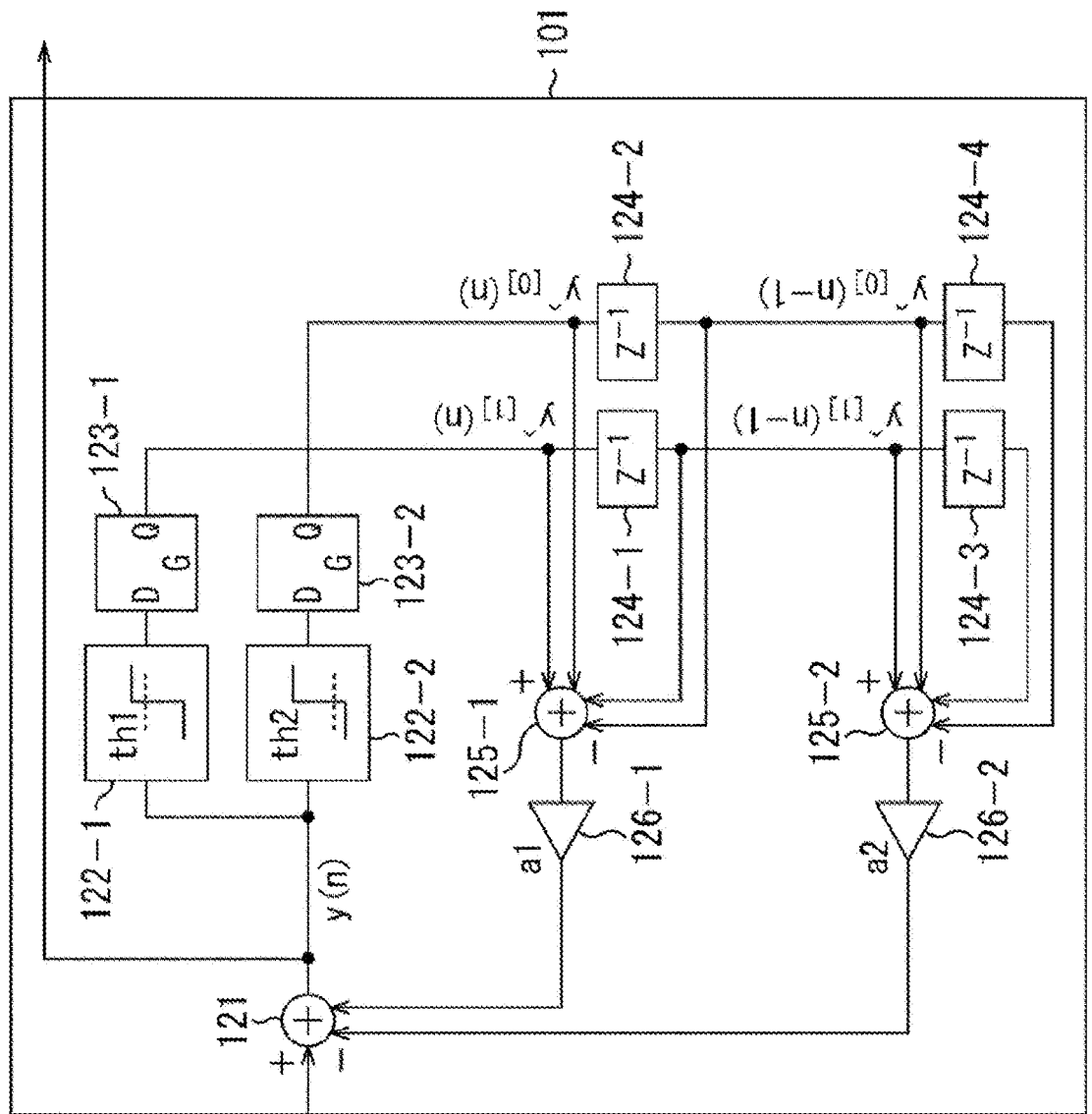
FIG. 8 is a diagram illustrating an exemplary configuration of a DFE.

A description will be provided for a case where a decision feedback equalizer (DFE) is applied as a method to remove noise caused by crosstalk. FIG. 8 is a diagram illustrating a configuration of an embodiment of a DFE 101 in order to reduce the influence of crosstalk in the three-phase transmission.

The DFE 101 includes a subtractor 121, dual comparators 122-1 and 122-2, through latches 123-1 and 123-2, delay units 124-1 to 124-4, subtractors 125-1 and 125-2, and multipliers 126-1 and 126-2.

The DFE 101 illustrated in FIG. 8 illustrates a case where the number of taps is two, but the present technology is not limited to two taps and applicable to a case of having the multiple number of taps. Additionally, processing can be performed with higher accuracy by increasing the number of taps, but there is a possibility that a processing load is increased and a processing period is increased. Therefore, the DFE 101 is configured by setting the number of taps considering such a possibility and the accuracy.

Furthermore, a high pass filter (HPF) is provided in a prior stage of the DFE 101 or inside the DFE 101 although not illustrated in the DFE 101 illustrated in FIG. 8. For example, the HPF may be provided before the subtractor 121. Note that the HPF functions as a variable gain amplifier (VGA) that boosts a high frequency component, and an element having such a boosting function may be provided in the DFE 101 or a signal passing through such an element may be received in the DFE 101.

Additionally, the configuration of the DFE 101 illustrated in FIG. 8 is an example, and the DFE 101 can have a different configuration. For example, the DFE 101 illustrated in FIG. 8 includes the dual comparators 122, but can include a high-speed analog digital converter (ADC) instead of the dual comparators 122.

When a signal Tx(n) is transmitted via a transmission line 9, (channel inter symbol interference (ISI) hereinafter referred to as transmission line noise) caused by transmission characteristics of the transmission line, and high frequency noise (High Freq Noise) are superimposed on the signal Tx(n) from the transmission device 10, and the signal is received in the DFE 101. Regarding this phenomenon, the transmission line noise is superimposed on the signal Tx(n) at an adder 102, and the signal on which the transmission line noise has been superimposed is described as a signal x(n) in FIG. 18. Additionally, the high frequency noise is superimposed on the signal x(n) at an adder 103, and the signal on which the high frequency noise has been superimposed is described as a signal x'(n).

The signal x'(n) is received in the DFE 101. In the reception device 40 illustrated in FIG. 6, the DFE 101 is provided immediately after an input terminal Tin, for example, and a signal from which noise is removed by the DFE 101 is received in the amplifier 42. The DFE 101 is provided for each amplifier 42. For example, in the case of the reception device 40 illustrated in FIG. 6, the DFE 101 is provided for each of the amplifier 42A, the amplifier 42B, and the amplifier 42C.

For example, the signal SIGA (=signal x'(n)) having been received in the input terminal TinA is received in the subtractor 121 of the DFE 101. The subtractor 121 subtracts, from the received signal x'(n), output from the multiplier 126-1 and output from the multiplier 126-2.

A signal y(n) output from the subtractor 121 is supplied to each amplifier 42 and also supplied to the dual comparator 122-1 and the dual comparator 122-2. The dual comparator 122-1 compares a predetermined threshold value Th1 with the signal y(n), determines whether or not the signal y(n) is the threshold value Th1 or more, and outputs the determination result to the through latch 123-1.

Similarly, the dual comparator 122-2 compares a predetermined threshold value Th2 with the signal y(n), determines whether or not the signal y(n) is the threshold value Th2 or more, and supplies the determination result to the through latch 123-2.

Figure 9:
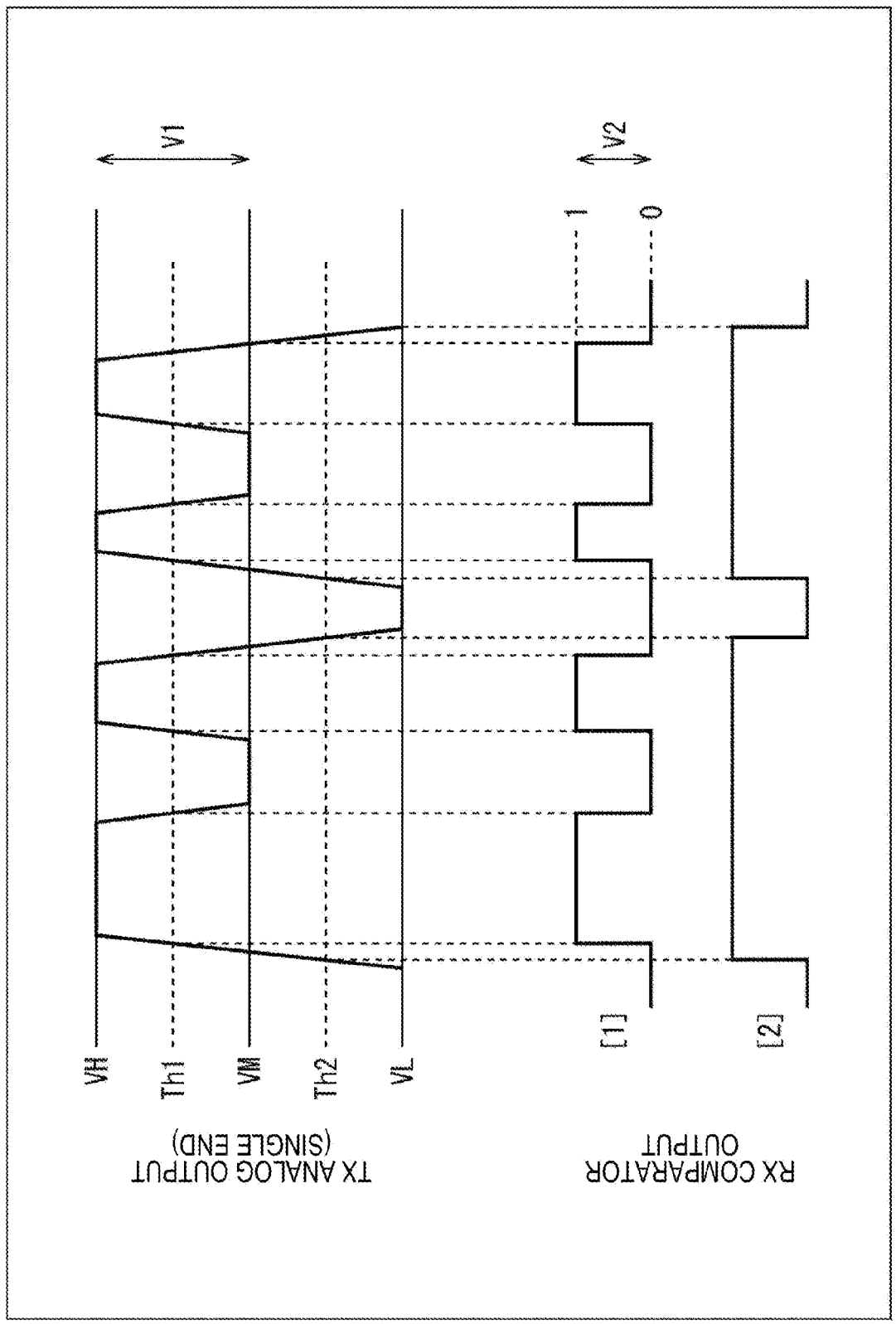
FIG. 9 is a diagram to describe a threshold value.

The threshold value Th1 and the threshold value Th2 satisfy a relation as illustrated in FIG. 9, for example. FIG. 9 is a diagram illustrating, for example, a waveform of the signal SIGA (that is a single-ended waveform and also is a waveform of a signal output from the transmission device 10) illustrated in FIG. 2.

As illustrated in an upper diagram of FIG. 9, the threshold value Th1 is set to a value that is the high-level voltage VH or less and a value that is the medium-level voltage VM or more. The threshold value Th1 can be, for example, an intermediate voltage value between the high-level voltage VH and the medium-level voltage VM. Note that the description here will be continued by exemplifying the case where the threshold value Th1 is set to the intermediate voltage value between the high-level voltage VH and the medium-level voltage VM. However, the value of the threshold value Th1 can be set to a value other than the intermediate voltage value, and for example, the processing can be performed while setting the threshold value Th1 to a value close to the high-level voltage Vh.

As illustrated in the upper diagram of FIG. 9, the threshold value Th2 is set to a value that is the medium-level voltage VM or less and a value that is the low-level voltage VL or more. For example, the threshold value Th2 can be an intermediate voltage value between the medium-level voltage VM and the low-level voltage VL. Note that the description here will be continued by exemplifying the case where the threshold value Th2 is set to the intermediate voltage value between the medium-level voltage VM and the low-level voltage VL. However, the value of the threshold value Th2 can be set to a value other than the intermediate voltage value, and for example, the processing can be performed while setting the threshold value Th2 to a value close to the low-level voltage VL.

Additionally, the description here will be continued assuming that the threshold values Th1 and Th2 are fixed values, but the threshold values may also variable values.

Alternatively, either the threshold value Th1 or the threshold value Th2 may be a variable value, and the other may be a fixed value.

The threshold value Th1 is set as a threshold value set in the dual comparator 122-1 (FIG. 8), and the threshold value Th2 is set as a threshold value set in the dual comparator 122-2.

In the case of three-phase transmission, the threshold value is set to a value (voltage value) within the adjacent phases among the three phases (in a case of transmitting a signal that transitions between the three voltage levels), for example, between the phase of the high-level voltage VH and the phase of the medium-level voltage VM. In a case of N-phase transmission, the threshold value is set to a value within adjacent phases among the N phases, and each dual comparator performs comparison with a preset threshold value.

As illustrated in a lower diagram of FIG. 9, the dual comparator 122-1 compares the received signal y(n) with the threshold value Th1, and in a case where the signal y(n) is larger than the threshold value Th1, the dual comparator outputs "1" to the through latch 123-1, and in a case where the signal y(n) is smaller than the threshold value Th1, the dual comparator outputs "0" to the through latch 123-1. Meanwhile, in a case where the signal y(n) is the same value as the threshold value Th1, "1" may be set to be output or "0" may be set to be output.

Similarly, as illustrated in the lower diagram of FIG. 9, the dual comparator 122-2 compares the received signal y(n) with the threshold value Th2, and in a case where the signal y(n) is larger than the threshold value Th2, the dual comparator outputs "1" to the through latch 123-2, and in a case where the signal y(n) is smaller than the threshold value Th2, the dual comparator outputs "0" to the through latch 123-2. Meanwhile, in a case where the signal y(n) is the same value as the threshold value Th2, "1" may be set to be output or "0" may be set to be output.

The output from each of the through latch 123-1 and the through latch 123-2 is supplied to the subtractor 125-1, respectively. Additionally, the output from the through latch 123-1 is supplied to the delay unit 124-1, and the output from the through latch 123-2 is supplied to the delay unit 124-2.

The subtractor 125-1 is supplied with: data ŷ[1](n) from the through latch 123-1 at time t; the data ŷ[0](n) from the through latch 123-2 at time t; data ŷ[1](n−1) delayed by the delay unit 124-1 and transmitted from the through latch 123-1 at time t−1; and data ŷ[0](n−1) delayed by the delay unit 124-2 and transmitted from the through latch 123-2 at time t−1.

For example, ^ of the data ŷ[1](n) indicates that the data is decision data, and here indicates that the decision data is 1 bit of 0 or 1 here. Additionally, [1] indicates that the data comes from the through latch 123-1, and [0] indicates that the data comes from the through latch 123-2.

Furthermore, (n) indicates that the data is $n_{th}$ data. Additionally, the $n_{th}$ data is defined as reference and, for example, (n−1) indicates that data is located before the $n_{th}$ data. Also, the $n_{th}$ data here is the data output from a through latch 123 at time t, and for example, data output from the through latch 123 at time t−1 that is time before time t is represented as (n−1).

The subtractor 125-1 adds the supplied data ŷ[1](n) and the data ŷ[0](n), and subtracts the data ŷ[1](n−1) and the data ŷ[0](n−1) from the added value. In other words, the subtractor 125-1 calculates a difference in the data between current time t and the previous time t−1. Note that calculation in a subtractor 125 is merely an example, and different calculation can also be performed.

The subtractor 125-1 also performs processing to multiply data from the delay unit 124-1 by a signal level scaling coefficient $K_{LV}$ (described later). Note that this multiplication processing can be omitted in a case of the signal level scaling coefficient $K_{LV}=1$.

The calculation result at the subtractor 125-1 is supplied to the multiplier 126-1. The multiplier 126-1 performs multiplication by an ISI coefficient a1 and supplies the multiplied result to the subtractor 121.

The DFE 101 illustrated in FIG. 8 further includes delay units 124-3 and 124-4, and performs processing also by using data at time t−2 further prior to time t−1.

The delay unit 124-3 is supplied with the data ŷ[1](n−1) output from the delay unit 124-1 and outputs, to the subtractor 125-2, data ŷ[1](n−2) delayed by a predetermined time. The delay unit 124-4 is supplied with the data ŷ[0](n−1) output from the delay unit 124-2 and outputs, to the subtractor 125-2, data ŷ[0](n−2) delayed by a predetermined time.

The data ŷ[1](n−1) output from the delay unit 124-1 is also supplied to the subtractor 125-2. The data ŷ[0](n−1) output from the delay unit 124-2 is also supplied to the subtractor 125-2 in the same manner.

The subtractor 125-2 adds the supplied data y"[1](n−1) and the data y"[0](n−1), and subtracts the data ŷ[1](n−2) and the data ŷ[0] (n−2) from the added value. In other words, the subtractor 125-1 calculates a difference in the data between time t−1 and the previous time t−2.

Meanwhile, the subtractor 125-2 also performs processing to multiply the data from the delay unit 124-2 by the signal level scaling coefficient $K_{LV}$ (described later), and performs the above-described calculation by using the data obtained after multiplication. Note that this multiplication processing can be omitted in a case of the signal level scaling coefficient $K_{LV}=1$.

The calculation result at the subtractor 125-2 is supplied to the multiplier 126-2. The multiplier 126-2 performs multiplication by an ISI coefficient a2 and supplies the multiplied result to the subtractor 121.

The subtractor 121 generates a value (signal y(n)) obtained by subtracting, from the signal x'(n) transmitted from the transmission device 10, the data from the multiplier 126-1 and the data from the multiplier 126-2, and outputs the generated value to a subsequent stage.

The processing in the DFE 101 is represented by Expression (1) below. Note that next Expression (2) represents a case where the DFE 101 includes the multiple number of taps.

[Expression 1]

$$y(t) = A \cdot d(n) + \sum_{i=1} a_i \cdot ((d(n-i+1) - d(n-i)) - \\ k_{LV} \cdot (((\hat{y}_{[1]}(n-i+1) + \hat{y}_{[0]}(n-i+1)) - \\ ((\hat{y}_{[1]}(n-i) + \hat{y}_{[0]}(n-i)))) + N(nT)$$

(1)

Figure 10:
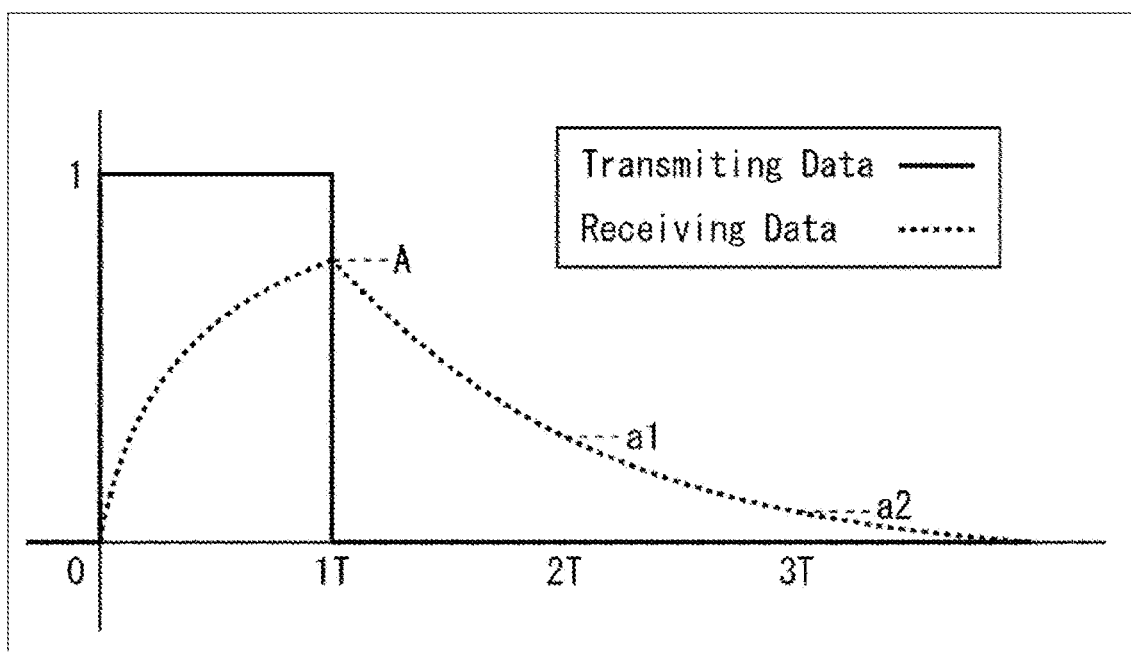
FIG. 10 is a diagram to describe a coefficient A.

In Expression (1), "A" represents a value corresponding to "A" illustrated in a graph illustrated in FIG. 10. FIG. 10 is a diagram illustrating a relation between a level of a transmitted signal and a level of the signal at the time of receipt. For example, in the graph illustrated in FIG. 10, a solid line represents transmission data and a dotted line represents reception data. A vertical axis represents a level, and a horizontal axis represents time.

For example, when data having a level "1" is transmitted during a period from time 0 to time 1T on the transmission side, the data having the level "A" is received at time 1T on the reception side. In this case, it can be grasped that the level "1" is a transmission system in which reception is performed while the level is attenuated to the level "A" during transmission. The "A" in Expression (1) is a value indicating a maximum value of the level received on the reception side among the levels transmitted on the transmission side.

Also, in FIG. 10, "a1" and "a2" are ISI coefficients to be multiplied at the multipliers 126-1 and 126-2, respectively.

In Expression (1), data transmitted from the transmission device 10 side at time t is defined as d(n−i). In other words, the data transmitted from the transmission device 10 side at time t=(n−1)T is defined as d(n−i). Additionally, the channel ISI coefficient at this point is $a_i$ (i=1, 2, 3, ... ).

In Expression (1), y(t) represents output (analog value) of the DFE 101, y^[1](t) represents binary decision data (MSB), and y^[0] (t) represents binary decision data (LSB).

Additionally, in Expression (1), $K_{LV}$ represents the signal level scaling coefficient. Referring again to FIG. 9, assuming that a differential voltage between the high-level voltage VH and the medium-level voltage VM of a signal from the transmission device 10 is defined as voltage V1 and a differential voltage between 0 and 1 in the output of dual comparators 122 of the reception device 40 is defined as voltage V2, the signal level scaling coefficient $K_{LV}$ is a coefficient represented by a ratio between the voltage V1 and the voltage V2.

$$K_{LV}=V1/V2$$

Also, in Expression (1), N(nT) represents high frequency noise.

A received signal x'(t) (represented as signal x'(n) in FIG. 8) received in the reception device 40 can be expressed by Expression (2) below.

[Expression 2]

$$x'(t) = A \cdot d(n) + \sum_{i=1} a_i \cdot (d(n-i+1) - d(n-i)) + N(nT) \quad (2)$$

In Expression (2), a first term on a right side represents the data transmitted from the transmission device 10, a second term represents an ISI component (transmission noise component), and a third term represents a high frequency noise component.

Referring to Expressions (1) and (2), the high frequency noise component N(nT) is not amplified and remains as an unchanged value. With use of the DFE 101, processing can be performed without amplifying the high frequency noise component. Crosstalk belongs to the high frequency noise. Therefore, using the DFE 101, it is possible to provide an equalizer that does not amplify a crosstalk component.

Additionally, the DFE 101 performs equalization for transmission line noise components by subtracting, from a transmission line noise component ($a_i \cdot d(n-i)$) of received data, binary decision data (($a_i \cdot \hat{y}(n-i)$)) multiplied by a DFE tap coefficient. Additionally, a transmission line noise component (channel ISI component) is varied by a voltage fluctuation amount due to data transition.

For example, in the case of the three-phase transmission, it is difficult to correct a channel ISI component only by simply subtracting the binary decision data ($a_i \cdot \hat{y}(n-i)$) from the transmission line noise component ($a_i \cdot d(n-i)$). Accordingly, in the present technology, the two dual comparators 122-1 and 122-2 are provided as illustrated in FIG. 8, and information of a signal transition amount is obtained by calculating decision data of nT and (n−1)T.

Consequently, the channel ISI component can be corrected even in the case of the three-phase transmission.

For example, in a case of d(n)={3, 2, 1}, ((d(n)−d(n−i)) in a channel ISI term held in the received data (a second term on a right side of Expression (1)) takes five values of {+2, +1, 0, −1, −2}.

Additionally, ((ŷ[1](n−i+1)+ŷ[0](n−i+1))−(ŷ[1] (n−i)+ŷ[0](n−i)) in the channel ISI term (the second term on the right side of Expression (1)) also takes five values {+2, +1, 0, −1, −2} in the same manner. Therefore, it is possible to correct a channel ISI component.

Thus, according to the present technology, it is possible to suppress crosstalk component in a system that performs transmission influenced by the crosstalk, such as the three-phase transmission.

Figure 11:
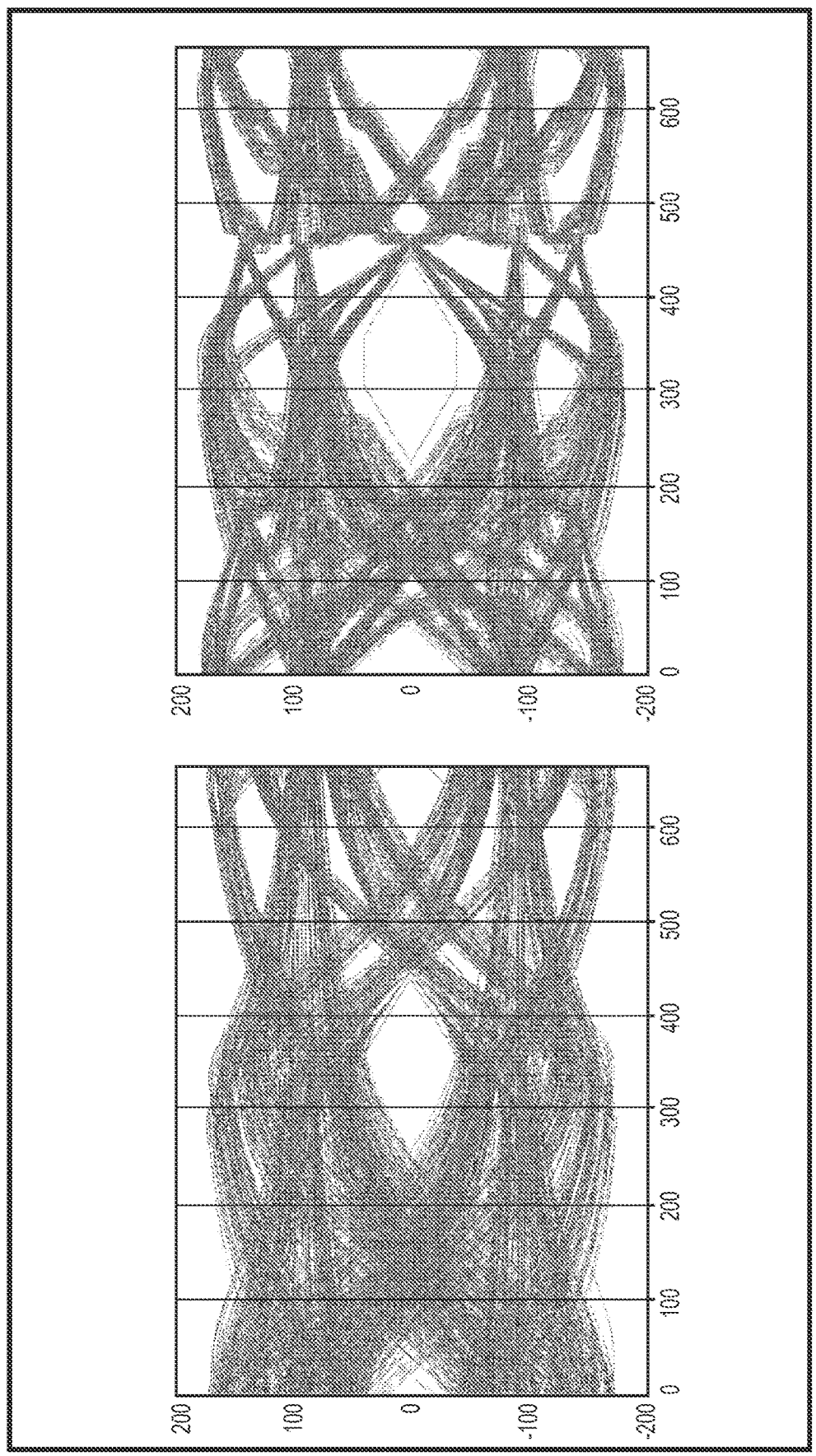
FIG. 11 provides views to describe effects in a case of applying the present technology.

A view on a left side of FIG. 11 is an eye pattern representing a reception result in the three-phase transmission at the reception device 40 not including the DFE 101 to which the present technology is applied, and a view on a right side is an eye pattern representing a reception result in the three-phase transmission at the reception device 40 including the DFE 101 to which the present technology is applied.

It can be read from the eye patterns illustrated in FIG. 11 that: the eye pattern on the right side exhibits better reception than the eye pattern on the left side (the reception result can be processed). Therefore, it can also be grasped from the eye patterns illustrated in FIG. 11 that: according to the reception device 40 including the DFE 101 to which the present technology is applied, a crosstalk component can be corrected even in a system that performs transmission influenced by the crosstalk, such as the three-phase transmission.

<Equalization Technology 2 to Suppress Crosstalk>

In the above-described DFE 101, feedback delay may occur due to feedback application. In a case where a system that may have the above-described problem of feedback delay or higher speed is desired, a feed forward equalizer (FFE) can also be applied.

Figure 12:
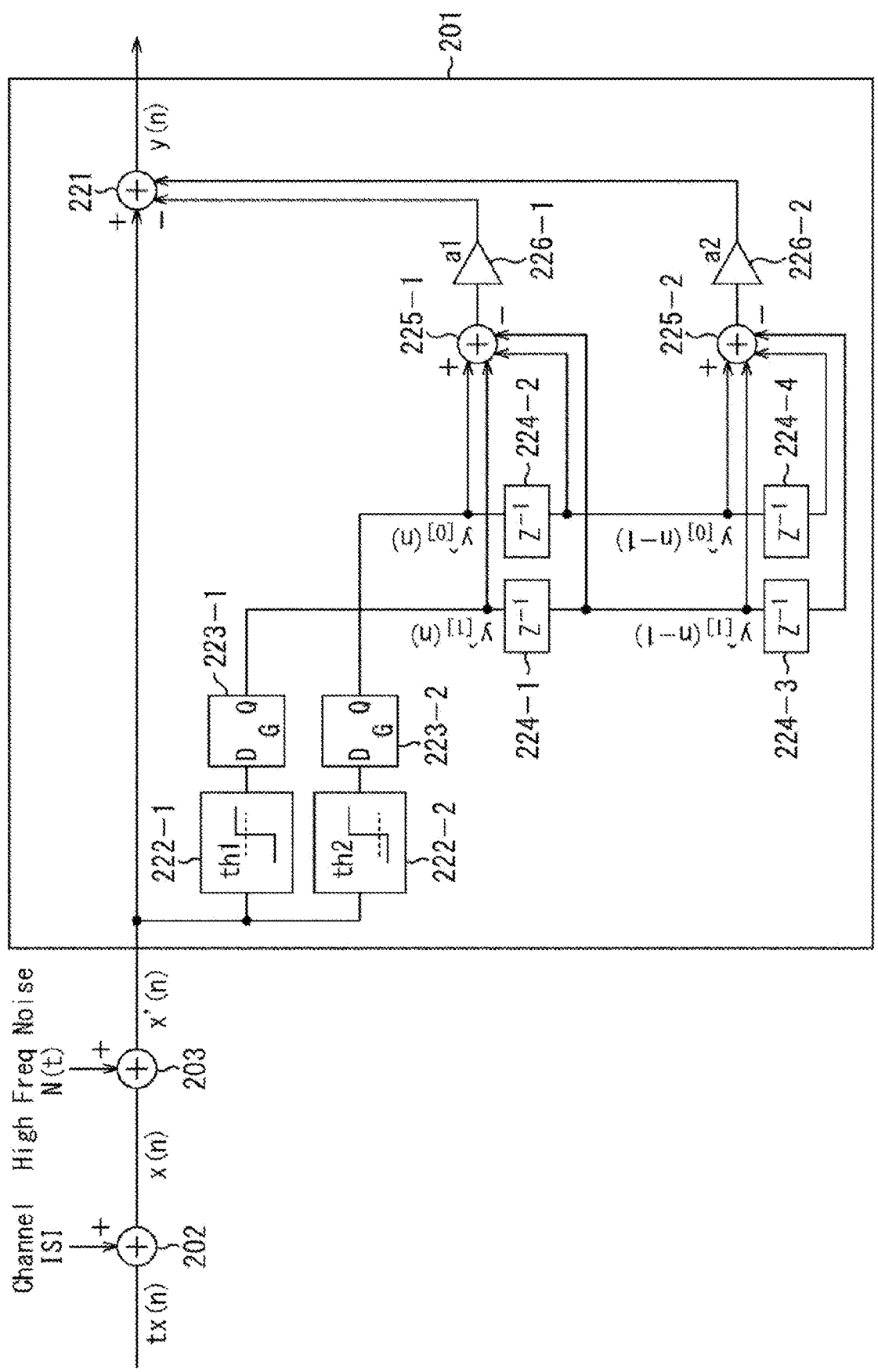
FIG. 12 is a diagram illustrating an exemplary configuration of an FFE.

A description will be provided for a case where the FFE is applied as the equalization technology 2 to suppress the crosstalk. FIG. 12 is a diagram illustrating a configuration of one embodiment of an FFE 201 to reduce influence of crosstalk in the three-phase transmission.

The FFE 201 includes a subtractor 221, dual comparators 222-1 and 222-2, through latches 223-1 and 223-2, delay units 224-1 to 224-4, subtractors 225-1 and 225-2, and multipliers 226-1 and 226-2.

The FFE 201 illustrated in FIG. 12 illustrates a case where the number of taps is two, but the present technology is not limited to two taps and applicable to a case of having the multiple number of taps. Additionally, processing can be performed with higher accuracy by increasing the number of taps, but there is a possibility that a processing load is increased and a processing period is increased. Therefore, the FFE 201 is configured by setting the number of taps considering such a possibility and the accuracy.

Comparing the FFE 201 illustrated in FIG. 12 with the DFE 101 illustrated in FIG. 8, elements constituting the FFE 201 are similar to the elements constituting the DFE 101, and include elements such as the dual comparators 222 and the subtractors 225 as described above.

The DFE 101 performs processing by feedback, whereas the FFE 201 performs processing by feedforward. The FFE 201 will be described while suitably omitting the description overlapping with the description of the DFE When a signal Tx(n) from the transmission device 10 is transmitted through a transmission line 9, transmission line noise and high frequency noise are superimposed and the signal becomes a signal x'(n), and the signal is received in the FFE 201. For example, the FFE 201 is provided immediately after the input terminal Tin of the reception device 40 illustrated in FIG. 6, and a signal from which noise is removed by the FFE 201 is received in the amplifier 42. The FFE 201 is provided for each amplifier 42. For example, in the case of the reception device 40 illustrated in FIG. 6, the FFE 201 is provided for each of the amplifier 42A, the amplifier 42B, and the amplifier 42C.

For example, the signal SIGA (=signal x'(n)) that has been received in the input terminal TinA is received in the subtractor 221, the dual comparator 222-1, and the dual comparator 222-2 of the FFE 201.

The subtractor 221 subtracts, from the received signal x'(n), output from the multiplier 226-1 and output from the multiplier 226-2. A signal y(n) output from the subtractor 221 is supplied to each amplifier 42.

The dual comparator 222-1 compares a predetermined threshold value Th1 with the signal y(n), determines whether or not the signal y(n) is the threshold value Th1 or more, and outputs the determination result to the through latch 223-1. Similarly, the dual comparator 222-2 compares a predetermined threshold value Th2 with the signal y(n), determines whether or not the signal y(n) is the threshold value Th2 or more, and outputs the determination result to the through latch 223-2.

The threshold value Th1 and the threshold value Th2 can be set in a manner similar to the case of the DFE 101, and for example, the relation as illustrated in FIG. 9 is satisfied.

The output from each of the through latch 223-1 and the through latch 223-2 is supplied to the subtractor 225-1. Additionally, the output from the through latch 223-1 is also supplied to the delay unit 224-1. Furthermore, the output from the through latch 223-2 is also supplied to the delay unit 224-2.

The subtractor 225-1 is supplied with: data y^[1](n) from the through latch 223-1 at time t; data y^[0](n) from the through latch 223-2 at time t; data y^[1](n−1) delayed by the delay unit 224-1 and transmitted from the through latch 223-1 at time t−1; and data y^[0](n−1) delayed by the delay unit 224-2 and transmitted from the through latch 223-2 at time t−1.

The subtractor 225-1 adds the supplied data y^[1](n) and the data y^[0] (n), and subtracts the data y^[1](n−1) and the data y^[0](n−1) from the added value. In other words, the subtractor 225-1 calculates a difference in the data between the current time t and the previous time t−1. Note that calculation in the subtractor 225 is merely an example, and different calculation can also be performed.

The calculation result in the subtractor 225-1 is supplied to the multiplier 226-1. The multiplier 226-1 performs multiplication by an ISI coefficient a1 and supplies the multiplied result to the subtractor 221.

Similarly, the delay unit 224-3 is supplied with the data y^[1](n−1) output from the delay unit 224-1 and outputs, to the subtractor 225-2, data y^[1](n−2) delayed by a predetermined time. The delay unit 224-4 is supplied with the data y^[0](n−1) output from the delay unit 224-2 and outputs, to the subtractor 225-2, data y^[0](n−2) delayed by a predetermined time.

The data y^[1](n−1) output from the delay unit 224-1 is also supplied to the subtractor 225-2. The data y^[0](n−1) output from the delay unit 224-2 is also supplied to the subtractor 225-2 in the same manner.

The subtractor 225-2 adds the supplied data y"[1](n−1) and the data y"[0](n−1), and subtracts the data y^[1](n−2) and the data y^[0] (n−2) from the added value. In other words, the subtractor 225-1 calculates a difference between time t−1 and the preceding time t−2.

The calculation result in the subtractor 225-2 is supplied to the multiplier 226-2. The multiplier 226-2 performs multiplication by an ISI coefficient a2 and supplies the multiplied result to the subtractor 221.

The subtractor 221 generates a value (signal y(n)) obtained by subtracting, from the signal x'(n) transmitted from the transmission device 10, the data from the multiplier 226-1 and the data from the multiplier 226-2, and outputs the generated value to a subsequent stage.

The processing in the FFE 201 is represented by the following Expression (3). Note that next Expression (3) is an expression in a case where the FFE 201 includes the multiple number of taps.

[Expression 3]

$$y(t) = A \cdot d(n) + \sum_{i=1} a_i \cdot ((d(n-i+1) - d(n-i)) - \\ k_{LV} \cdot (((y^\hat{}_{[1]}(n-i+1) + y^\hat{}_{[0]}(n-i+1)) - \\ ((y^\hat{}_{[1]}(n-i) + y^\hat{}_{[0]}(n-i)))) + \sum_{i=1} a_i \cdot N(nT) \quad (3)$$

In Expression (3), "A" is a value corresponding to "A" illustrated in the graph illustrated in FIG. 10. In Expression (3), "$a_i$" is a coefficient corresponding to "a1" and "a2" in FIG. 10 and is an ISI coefficient multiplied in each of the multiplier 226-1 and 226-2.

In Expression (3), data transmitted from the transmission device 10 side at time t is defined as d(n−i). In other words, the data transmitted from the transmission device 10 side at time t=(n−1)T is defined as d(n−i). Additionally, the channel ISI coefficient at this point is $a_i$ (i=1, 2, 3, . . . ).

In Expression (3), y(t) represents output (analog value) of the FFE 201, y^[1](t) represents binary decision data (MSB), and y^[0] (t) represents binary decision data (LSB).

Additionally, in Expression (3), $K_{LV}$ represents a signal level scaling coefficient and is a coefficient represented by a ratio between voltage V1 and voltage V2 as referred to FIG. 9.

$$K_{LV} = V1/V2$$

Also in Expression (3), N(nT) represents high frequency noise.

In Expression (3), a first term on a right side represents the data transmitted from the transmission device 10, a second term represents an ISI component (transmission noise component), and a third term represents a high frequency noise component.

The FFE 201 performs equalization for transmission line noise components by subtracting, from a transmission line noise component ($a_i \cdot d(n-i)$) of received data, binary decision data (($a_i \cdot y^\hat{}(n-i)$)) multiplied by a FFE tap coefficient in the same manner as the DFE 101.

Additionally, a transmission line noise component (channel ISI component) is varied by a voltage fluctuation amount due to data transition.

For example, in the case of the three-phase transmission, it is difficult to correct a channel ISI component only by simply subtracting the binary decision data ($a_i \cdot \hat{y}(n-i)$) from the transmission line noise component ($a_i \cdot d(n-i)$). Accordingly, in the present technology, the two dual comparators 222-1 and 222-2 are provided as illustrated in FIG. 12, and information of a signal transition amount is obtained by calculating decision data of nT and (n−1)T.

Consequently, the channel ISI component can be corrected even in the case of the three-phase transmission.

For example, in a case of d(n)={3, 2, 1}, ((d(n)−d(n−i)) in a channel ISI term of the received data (the second term on the right side of Expression (3)) takes five values of {+2, +1, 0, −1, −2}.

Additionally, $((\hat{y}[1](n-i+1)+\hat{y}[0](n-i+1))-(\hat{y}[1](n-i)+\hat{y}[0](n-i))$ in the channel ISI term (the second term on the right side of Expression (3)) also takes five values {+2, +1, 0, −1, −2} in the same manner. Therefore, it is possible to correct a channel ISI component.

Thus, according to the present technology, it is possible to improve waveform quality in a system that performs transmission influenced by the crosstalk, such as the three-phase transmission.

In the case of FFE 201, it can be read, with reference to Expression (3), that a high frequency noise component of the third term on the right side is amplified. In the case of the FFE 201, the high frequency noise component is amplified more than in the DFE 101, but the processing can be easily speeded up because there is no feedback loop, different the DFE 101.

Figure 13:
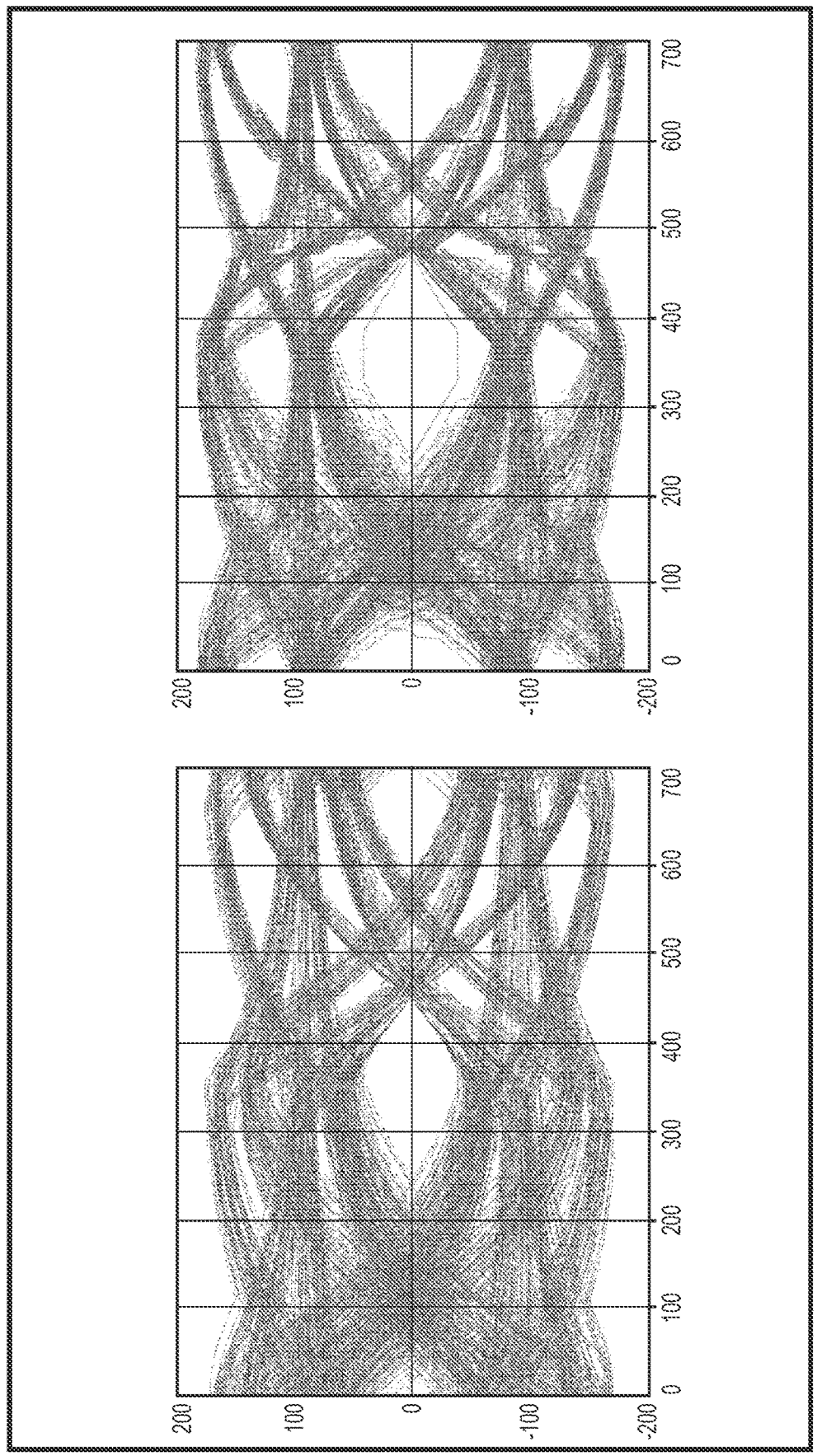
FIG. 13 provides views describe the effects in the case of applying the present technology.

A view on a left side of FIG. 13 is an eye pattern representing a reception result in the three-phase transmission at the reception device 40 not including the FFE 201 to which the present technology is applied, and a view on a right side is an eye pattern representing a reception result in the three-phase transmission at the reception device 40 including the FFE 201 to which the present technology is applied.

It can be read from the eye patterns illustrated in FIG. 13 that: the eye pattern on the right side exhibits better reception than the eye pattern on the left side (the reception result can be processed). From this fact, it can also be grasped that: according to the reception device 40 including the FFE 201 to which the present technology is applied, the waveform quality can be improved even in a system that performs transmission influenced by the crosstalk, such as the three-phase transmission.

As described above, according to the present technology, the waveform quality can be improved. Additionally, the present technology can be applied to a transmission system having multiple lines and multiple phases, and can improve the waveform quality even in the case of being applied to the transmission system having multiple lines and multiple phases. Additionally, the present technology can be applied to a high-speed transmission system, and can improve the waveform quality even in the case of being applied to the high-speed transmission system.

In the above-described embodiment, the case of the two taps has been described as an example, but the DFE 101 and the FFE 201 may each include one tap or two or more taps.

Additionally, in the above-described embodiment, the case where the number of dual comparators 122 (222) is two has been described as an example, but two or more dual comparators 122 (222) can also be included in the DFE 101 and the FFE 201.

That is, in the above-described embodiment, the case where the processing is performed with the two threshold values (two thresholds) has been described as an example, but the processing can be performed by using two or more threshold values.

For example, in the case of the three-phase transmission, the DFE 101 or the FFE 201 can perform the processing by using the two threshold values. Additionally, for example, in the case of the three-phase transmission, the processing can be performed by using two or more threshold values, for example, three threshold values.

For example, in the case of N-phase transmission, the DFE 101 or the FFE 201 can perform the processing by using (N−1) threshold values.

Additionally, one tap includes the number of delay units, the number of subtractors, and the number of multipliers, conforming to (the same number as) the number of threshold values to be used. For example, in the case where the processing is performed by using (N−1) threshold values, (N−1) delay units are included in one tap, and furthermore, one subtractor that performs subtraction for pieces of data from the delay units and pieces of data from the dual comparators, and one multiplier that multiplies data from the subtractor by a predetermined coefficient.

According to the present technology, signal quality can be improved even in a high-speed transmission system having multiple lines and multiple phases by the dual comparators having the plurality of thresholds and by feedback level control in accordance with voltage change amounts in transition of symbols in the successive multiple lines and multiple phases.

The above-described signal processing device is applicable to a mobile industry processor interface (MIPI), for example. The MIPI is an interface standard used with a camera and a display of a mobile device, and is applicable to an interface having a C-PHY standard included in the interface standard.

Since the C-PHY transmits and receives signals by the above-described three-phase transmission, communication that suppresses high frequency noise component such as crosstalk can be performed by applying the above-described present technology. For example, the DFE 101 illustrated in FIG. 8 or the FFE 201 illustrated in FIG. 12 to which the present technology is applied can be included in the interface having the C-PHY standard of the MIPI <Regarding Recording Medium>

The above-described series of processing can be executed by hardware and can also be executed by software. In the case of executing the series of processing by software, a program constituting the software is installed in a computer. Here, the computer includes, for example, a computer incorporated in dedicated hardware, a general-purpose personal computer capable of executing various kinds of functions by installing various kinds of programs, or the like.

Figure 14:
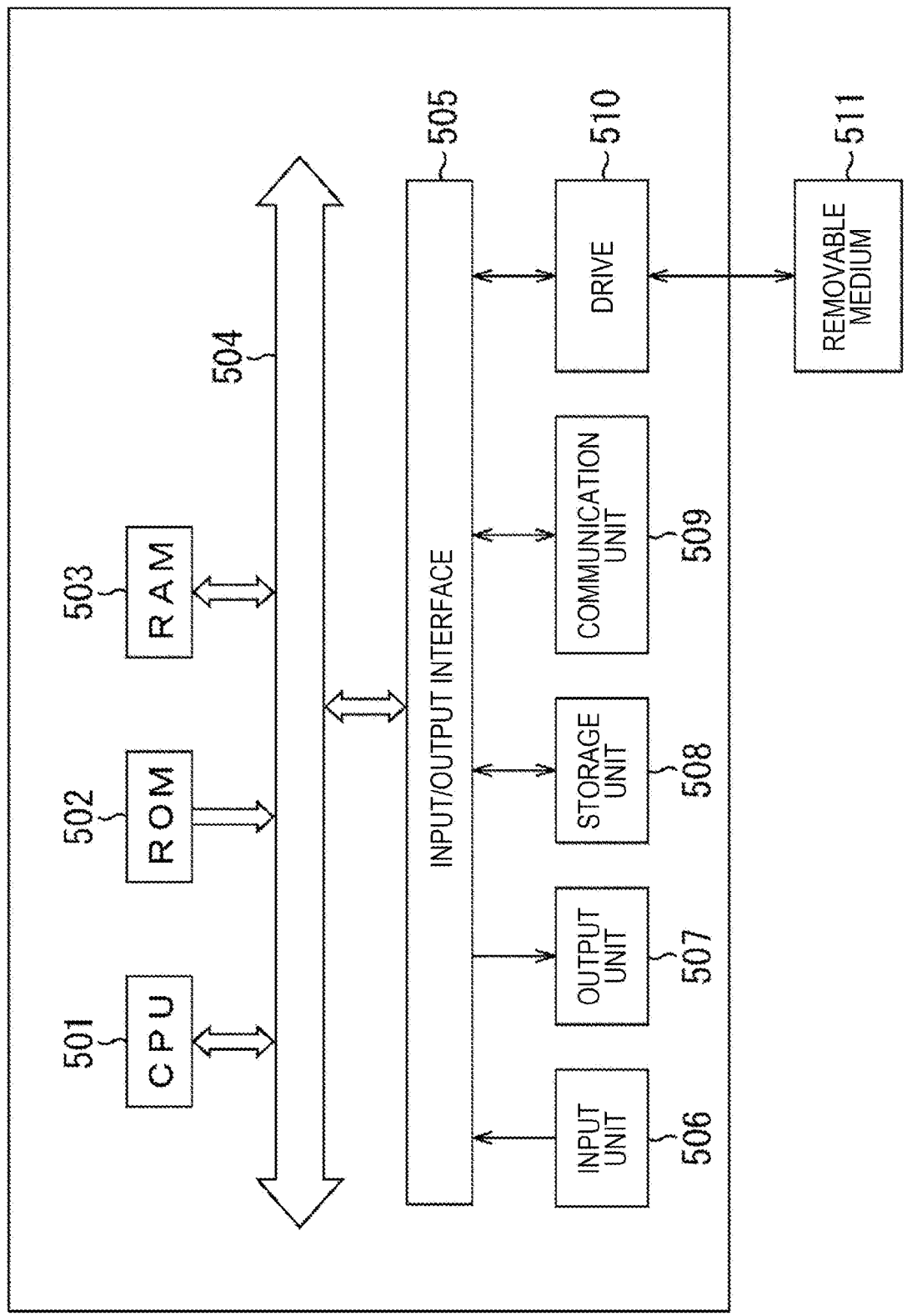
FIG. 14 is a diagram to describe a recording medium.

FIG. 14 is a block diagram illustrating an exemplary hardware configuration of the computer adapted to execute the above-described series of processing by a program. In the computer, a central processing unit (CPU) 501, a read only memory (ROM) 502, and a random access memory (RAM) 503 are mutually connected via a bus 504. The bus 504 is further connected to an input/output interface 505. The input/output interface 505 is connected to an input unit 506, an output unit 507, a storage unit 508, a communication unit 509, and a drive 510.

The input unit 506 includes a keyboard, a mouse, a microphone, and the like. The output unit 507 includes a display, a speaker, and the like. The storage unit 508 includes a hard disk, a nonvolatile memory, and the like. The communication unit 509 includes a network interface and the like. The drive 510 drives a removable medium 511 such as a magnetic disk, an optical disk, a magneto-optical disk, and a semiconductor memory.

In the computer having the above-described configuration, the above-described series of processing is performed by, for example, the CPU 501 loading, in the RAM 503, a program stored in the storage unit 508 via the input/output interface 505 and the bus 504, and executing the program.

The program executed by the computer (CPU 501) can be provided by, for example, being recorded in the removable medium 511 such as a package medium. Also, the program can be provided via a wired or wireless transmission medium such as a local area network, the Internet, and digital satellite broadcasting.

In the computer, the program can be installed in the storage unit 508 via the input/output interface 505 by attaching the removable medium 511 to the drive 510. Additionally, the program can be received in the communication unit 509 via a wired or wireless transmission medium and installed in the storage unit 508. Besides, the program can be preliminarily installed in the ROM 502 or the storage unit 508.

Meanwhile, the program executed by the computer may be a program by which the processing is chronologically performed in accordance with the order described in the present specification or may be a program by which the processing is performed in parallel or at necessary timing such as when the program is called.

Additionally, in the present specification, the system represents an entire apparatus including a plurality of devices.

Note that the effects described in the present specification are only examples and not limited thereto, and other effects may also be provided.

Meanwhile, the embodiments of the present technology are not limited to the above-described embodiments, and various kinds of modifications can be made within a range without departing from the gist of the present technology.

Note that the present technology may also adopt the following configurations.

(1)

A signal processing device including:

a plurality of comparators;

a delay unit adapted to delay output from each of the plurality of comparators; and a subtractor adapted to subtract, from a supplied signal, a signal from the delay unit.

(2)

The signal processing device recited in (1) above, in which signals transmitted in N phases are processed.

(3)

The signal processing device recited in (1) above, in which signals which are transmitted through N transmission lines and transmit a predetermined symbol in a combination of voltage levels are processed.

(4)

The signal processing device recited in (2) or (3) above, further including (N−1) or more comparators.

(5)

The signal processing device recited in any one or (1) to (4) above, in which each of the plurality of comparators has a different threshold value set and compares a received signal with the threshold value, and in a case where the signal transitions between a plurality of voltage levels, the threshold value is set to a value within adjacent voltage levels.

(6)

The signal processing device recited in any one of (1) to (5), in which in a case of processing a signal that transitions between three voltage levels including high-level voltage, medium-level voltage, and low-level voltage, a voltage value between the high-level voltage and the medium-level voltage is set to a first threshold value, and a voltage value between the medium-level voltage and the low-level voltage is set to a second threshold value, a first comparator compares the first threshold value with a supplied signal, a second comparator compares the second threshold value with a supplied signal, and the subtractor subtracts, from an added value of output from the first comparator and output from the second comparator, output delayed by a first delay unit and transmitted from the first comparator and output delayed by a second delay unit and transmitted from the second comparator.

(7)

The signal processing device recited in any one of (1) to (6), further including a second subtractor adapted to subtract, from a signal received in the signal processing device, a signal from the subtractor.

(8)

The signal processing device recited in (7) above, in which the comparator compares output from the second subtractor with a predetermined threshold value.

(9)

The signal processing device recited in (7) above, in which the comparator compares the received signal with a predetermined threshold value.

(10)

The signal processing device recited in any one of (1) to (8), in which the signal processing device is a decision feedback equalizer (DFE).

(11)

The signal processing device recited in any one of (1) to (7) or (9) above, in which the signal processing device is a feed forward equalizer (FFE).

(12)

The signal processing device recited in any one of (1) to (11) above, in which the signal processing device is included in an interface of a C-PHY standard of a mobile industry processor interface (MIPI).

(13)

A signal processing method including the steps of:

comparing a supplied signal with a predetermined threshold value by a plurality of comparators;

delaying a comparison result from each of the plurality of comparators; and subtracting the delayed comparison result from the supplied signal.

(14)

A program causing a computer to execute a process including the steps of:

comparing a supplied signal with a predetermined threshold value by a plurality of comparators;

delaying a comparison result from each of the plurality of comparators; and subtracting the delayed comparison result from the supplied signal.

REFERENCE SIGNS LIST

10 Transmission device
40 Reception device
41 Resistance element
42 Amplifier
43 Clock generation unit
44, 45 Flip flop
46 Signal generation unit
101 DFE
121 Subtractor
122 Dual comparator
123 Through latch
124 Delay unit
125 Subtractor
126 Multiplier
201 FFE
221 Subtractor
222 Dual comparator
223 Through latch
224 Delay unit
225 Subtractor
226 Multiplier

The invention claimed is:

1. A signal processing device comprising:
   a first subtractor configured to
     receive an input signal, and
     generate an output signal by subtracting a first signal from the input signal;
   a plurality of comparators, each comparator of the plurality of comparators is configured to receive a second signal, and
     generate a comparison output signal by comparing the second signal to a threshold;
   a plurality of delay units configured to generate a plurality of delayed signals by delaying the comparison output signal that is output from each of the plurality of comparators;
   a second subtractor configured to
     receive a plurality of comparison output signals that is output from the plurality of comparators,
     receive the plurality of delayed signals, and
     generate a third signal by subtracting the plurality of delayed signals from the plurality of comparison output signals; and
   a multiplier configured to generate the first signal by multiplying the third signal by a predetermined number.

2. The signal processing device according to claim 1, further comprising:
   a second plurality of delay units configured to generate a plurality of second delayed signals by delaying the plurality of delayed signals;
   a third subtractor configured to
     receive the plurality of delayed signals,
     receive the plurality of second delayed signals, and
     generate a fourth signal by subtracting the plurality of second delayed signals from the plurality of delayed signals; and
   a second multiplier configured to generate a fifth signal by multiplying the fourth signal by a second predetermined number, wherein the first subtractor is further configured to subtract the first signal and the fifth signal from the output signal.

3. The signal processing device according to claim 1, wherein the second signal is the output signal.

4. The signal processing device according to claim 1, wherein the second signal is the input signal.

5. The signal processing device according to claim 1, wherein the input signal is transmitted in N phases.

6. The signal processing device according to claim 5, wherein the plurality of comparators is
   (N-1) or more comparators.

7. The signal processing device according to claim 1, wherein
   the input signal is transmitted through N transmission lines, and
   the input signal is transmitted through the N transmission lines is a predetermined symbol in a combination of voltage levels.

8. The signal processing device according to claim 1,
   wherein, in a case where the input signal transitions between a plurality of voltage levels, the threshold value is set to a value within adjacent voltage levels, and
   wherein individual threshold values of the plurality of comparators are different from each other.

9. The signal processing device according to claim 1, wherein
   in a case of processing the input signal that transitions between three voltage levels including high-level voltage, medium-level voltage, and low-level voltage, a first voltage value between the high-level voltage and the medium-level voltage is set to a first threshold value, and a second voltage value between the medium-level voltage and the low-level voltage is set to a second threshold value,
   a first comparator of the plurality of comparators compares the input signal to the first threshold value, and
   a second comparator of the plurality of comparators compares the input signal to the second threshold value.

10. A signal processing method comprising:
    receiving, with a first subtractor, an input signal;
    generating, with the first subtractor, an output signal by subtracting a first signal from the input signal;
    receiving, with each of a plurality of comparators, a second signal;
    generating, with the each of the plurality of comparators, a comparison output signal by comparing the second signal to a threshold;
    generating, with each of a plurality of delay units, a plurality of delayed signals by delaying the comparison output signal that is output from each of the plurality of comparators;
    receiving, with a second subtractor, a plurality of comparison output signals that is output from the plurality of comparators;
    receiving, with the second subtractor, the plurality of delayed signals;
    generating, with the second subtractor, a third signal by subtracting the plurality of delayed signals from the plurality of comparison output signals; and
    generating, with a multiplier, the first signal by multiplying the third signal by a predetermined number.

11. The signal processing method according to claim 10, further comprising:

generating, with a second plurality of delay units, a plurality of second delayed signals by delaying the plurality of delayed signals;
receiving, with a third subtractor, the plurality of delayed signals;
receiving, with the third subtractor, the plurality of second delayed signals;
generating, with the third subtractor, a fourth signal by subtracting the plurality of second delayed signals from the plurality of delayed signals; and
generating, with a second multiplier, a fifth signal by multiplying the fourth signal by a second predetermined number,
wherein generating, with the first subtractor, the output signal by subtracting the first signal from the input signal further includes subtracting the first signal and the fifth signal from the output signal.

12. The signal processing method according to claim 10, wherein the second signal is the output signal.

13. The signal processing method according to claim 10, wherein the second signal is the input signal.

14. An electronic device comprising:
a signal processing device comprising:
  a first subtractor configured to
    receive an input signal, and
    generate an output signal by subtracting a first signal from the input signal;
  a plurality of comparators, each comparator of the plurality of comparators is configured to
    receive a second signal, and
    generate a comparison output signal by comparing the second signal to a threshold;
  a plurality of delay units, each of the plurality of delay units is configured to generate a delayed signal by delaying the comparison output signal that is output from each of the plurality of comparators;
  a second subtractor configured to
    receive a plurality of comparison output signals that is output from the plurality of comparators,
    receive a plurality of delayed signals that is output from the plurality of delay units, and
    generate a third signal by subtracting the plurality of delayed signals from the plurality of comparison output signals; and
  a multiplier configured to generate the first signal by multiplying the third signal by a predetermined number.

15. The electronic device according to claim 14, wherein the signal processing device further includes
  a second plurality of delay units configured to generate a plurality of second delayed signals by delaying the plurality of delayed signals;
  a third subtractor configured to
    receive the plurality of delayed signals,
    receive the plurality of second delayed signals, and
    generate a fourth signal by subtracting the plurality of second delayed signals from the plurality of delayed signals; and
  a second multiplier configured to generate a fifth signal by multiplying the fourth signal by a second predetermined number,
wherein the first subtractor is further configured to subtract the first signal and the fifth signal from the output signal.

16. The electronic device according to claim 14, wherein the second signal is the output signal.

17. The electronic device according to claim 14, wherein the second signal is the input signal.

18. The electronic device according to claim 14, wherein the signal processing device is a decision feedback equalizer (DFE).

19. The electronic device according to claim 14, wherein the signal processing device is a feed forward equalizer (FFE).

20. The electronic device according to claim 14, further comprising:
an interface of a C-PHY standard of a mobile industry processor interface (MIPI),
wherein the signal processing device is included in the interface of the C-PHY standard of the mobile industry processor interface (MIPI).

* * * * *